United States Patent
Holland et al.

(10) Patent No.: US 10,091,218 B2
(45) Date of Patent: Oct. 2, 2018

(54) SYSTEM AND METHOD TO DETECT ATTACKS ON MOBILE WIRELESS NETWORKS BASED ON NETWORK CONTROLLABILITY ANALYSIS

(71) Applicant: HRL Laboratories, LLC, Malibu, CA (US)

(72) Inventors: Gavin D. Holland, Newbury Park, CA (US); Michael D. Howard, Westlake Village, CA (US); Chong Ding, Riverside, CA (US)

(73) Assignee: HRL Laboratories, LLC, Malibu, CA (US)

(*) Notice: Subject to any disclaimer, the term of this patent is extended or adjusted under 35 U.S.C. 154(b) by 243 days.

(21) Appl. No.: 15/075,058

(22) Filed: Mar. 18, 2016

(65) Prior Publication Data

US 2017/0318034 A1    Nov. 2, 2017

Related U.S. Application Data

(63) Continuation-in-part of application No. 14/625,988, filed on Feb. 19, 2015, and a continuation-in-part of
(Continued)

(51) Int. Cl.
*G06F 19/00* (2018.01)
*H04L 29/06* (2006.01)
(Continued)

(52) U.S. Cl.
CPC ......... *H04L 63/1416* (2013.01); *G06N 7/005* (2013.01); *G06N 99/005* (2013.01);
(Continued)

(58) Field of Classification Search
CPC ........ G06F 21/316; G06F 21/32; G06F 21/53; G06F 21/57
(Continued)

(56) References Cited

U.S. PATENT DOCUMENTS

| 6,865,509 B1 | 3/2005 | Hsiung et al. |
| 9,367,694 B2 | 6/2016 | Eck |

(Continued)

FOREIGN PATENT DOCUMENTS

| EP | 2535000 | 12/2012 |
| JP | 2010-061450 | 3/2010 |
| KR | 10-0767589 | 10/2007 |

OTHER PUBLICATIONS

Y.-Y. Liu, J.-J. Slotine, and A.-L. Barabási, "Controllability of complex networks," Nature, vol. 473, pp. 167-173, 2011.
(Continued)

*Primary Examiner* — Edward Raymond
(74) *Attorney, Agent, or Firm* — Tope-McKay & Associates

(57) ABSTRACT

Described is a system for detecting attacks of misinformation on communication networks. Network controllability metrics on a graphical representation of a communication network are computed. Changes in the network controllability metrics are detected, and attack of misinformation on the communication network are detected based on the detected changes in the network controllability metrics.

16 Claims, 11 Drawing Sheets

Related U.S. Application Data application No. 14/209,314, filed on Mar. 13, 2014, which is a continuation-in-part of application No. 13/904,945, filed on May 29, 2013, said application No. 13/904,945 is a continuation-in-part of application No. 13/748,223, filed on Jan. 23, 2013.

(60) Provisional application No. 61/941,893, filed on Feb. 19, 2014, provisional application No. 61/784,167, filed on Mar. 14, 2013, provisional application No. 61/589,634, filed on Jan. 23, 2012, provisional application No. 61/589,646, filed on Jan. 23, 2012, provisional application No. 61/694,510, filed on Aug. 29, 2012, provisional application No. 62/135,142, filed on Mar. 18, 2015, provisional application No. 62/135,136, filed on Mar. 18, 2015.

(51) Int. Cl.
*H04W 12/10* (2009.01)
*G06N 99/00* (2010.01)
*G06N 7/00* (2006.01)

(52) U.S. Cl.
CPC ...... *H04L 63/1425* (2013.01); *H04L 63/1441* (2013.01); *H04W 12/10* (2013.01)

(58) Field of Classification Search
USPC ......................... 702/183, 182, 184, 185, 188
See application file for complete search history.

(56) References Cited

U.S. PATENT DOCUMENTS

| | | |
|---|---|---|
| 2006/0010493 A1 | 1/2006 | Piesco et al. |
| 2006/0114903 A1 | 6/2006 | Duffy, IV |
| 2007/0019543 A1 | 1/2007 | Wei et al. |
| 2008/0301295 A1 | 12/2008 | Malkin et al. |
| 2009/0183260 A1 | 7/2009 | Hernacki et al. |
| 2010/0107254 A1 | 4/2010 | Elland et al. |
| 2010/0123465 A1 | 5/2010 | Owens |
| 2010/0250497 A1* | 9/2010 | Redlich ............... F41H 13/00 707/661 |
| 2010/0324376 A1 | 12/2010 | Chinnadurai |
| 2011/0066409 A1 | 3/2011 | Evans et al. |
| 2011/0280133 A1 | 11/2011 | Chang |
| 2012/0063595 A1 | 3/2012 | Massoudi |
| 2013/0091573 A1 | 4/2013 | Herz et al. |
| 2013/0139247 A1 | 5/2013 | Cianfrocca |
| 2013/0235757 A1 | 9/2013 | Wang |
| 2014/0053286 A1 | 2/2014 | Adams et al. |
| 2014/0143536 A1 | 5/2014 | Holland |

OTHER PUBLICATIONS

Y.-Y. Liu, J.-J. Slotine, and A.-L. Barabási "The observability of complex systems," PNAS, vol. 110, No. 7, pp. 2460-2465, 2013.
J.-P. Hubaux, L. Buttyán, and S. Capkun, "The quest for security in mobile ad hoc networks," in Proceedings of the 2nd ACM international symposium on Mobile ad hoc networking & computing, ACM, 2001, pp. 146-155.
S. Marti, T. J. Giuli, K. Lai, M. Baker et al., "Mitigating routing misbehavior in mobile ad hoc networks," in International Conference on Mobile Computing and Networking: Proceedings of the 6th annual international conference on Mobile computing and networking, vol. 6, No. 11, 2000, pp. 266-266.
H. Yang, J. Shu, X. Meng, and S. Lu, "Scan: self-organized network-layer security in mobile ad hoc networks," IEEE Journal on Selected Areas in Communications, vol. 24, No. 2, pp. 261-273 2006.
Y. Zhang and W. Lee, "Security in mobile ad-hoc networks," in Ad Hoc Networks. Springer, 2005, pp. 249-268.
K. Govindan and P. Mohapatra, "Trust computations and trust dynamics in mobile adhoc networks: a survey," Communications Surveys & Tutorials, IEEE, vol. 14, No. 2, pp. 279-298, 2012.
A. Jøsang, R. Ismail, and C. Boyd. "A survey a trust and reputation systems for online service provision," Decision suppoit systems, vol. 43, No. 2, pp. 618-644, 2007.
P. Michiardi and R. Moiva, "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.
S. Noel, M. Eider, S. Jajodia, P. Kalapa, S. O'Hare, and K. Prole, "Advances in topological vulnerability analysis," in Conference for Homeland Security, 2009. CATCH'09. Cybersecurity Applications & Technology. IEEE, 2009, pp. 124-129.
T. Karagiannis, K. Papagiannaki, and M. Faloutsos, "Blinc: multi-level traffic classification in the dark," In ACM SIGCOMM Computer Communication Review, vol. 35, No. 4. ACM, 2005, pp. 229-240.
S. Noel and S. Jajodia, "Understanding complex network attack graphs through clustered adjacency matrices," In Computer Security Applications Conference, 21st Annual. IEEE, 2005, pp. 1-10.
M. Durant and P. Thiran, "Layered complex networks," Physical review letters, vol. 96, No. 13, pp. 138701-1-138701-4, 2006.
Borgatti, S and M. Everett, "A graph-theoretic perspective on centrality," Social Networks, 28(4) pp. 466-484, 2006.
Notification of Transmittal of International Search Report and the Written Opinion of the International Searching Authority for PCT/US2016/023308; dated Dec. 23, 2016.
International Search Report of the International Searching Authority for PCT/US2016/023308; dated Dec. 23, 2016.
Written Opinion of the International Searching Authority for PCT/US2016/023308; dated Dec. 23, 2016.
J. A. Almendral and A. Díaz-Guilera, Dynamical and spectral properties of complex networks, New J. Phys. 9 187, 2007.
Banerjee, L. E. Ghaoui, and A. D'Aspremont. Model Selection through Sparse Maximum Likelihood Estimation for Multivariate Gaussian or Binary Data. Journal of Machine Learning Research, 9:485-516, 2008.
Bolstad, B. D. V. Veen, and R. Nowak. Causal Network Inference Via Group Sparse Regularization. IEEE Transaction on Signal Processing, 59(6): pp. 2628-2641, 2011.
G. L. Clark. Critical problems of geographical unemployment models. Progress in Human Geography, 1980.
V. Dakos, E. H. Nes, R. Donangelo, H. Fort, and M. Scheffer. Spatial correlation as leading indicator of catastrophic shifts. Theoretical Ecology, 3(3): pp. 163-174, Nov. 2009.
V. Dakos, M. Scheffer, E. H. van Nes, V. Brovkin, V. Petoukhov, and Held. Slowing Down as an Early Warning Signal for Abrupt Climate Change. Proceedings of the National Academy of Sciences of the United States of America, 105(38): pp. 14308-14312, Sep. 2008.
D. J. Fenn, M. A. Porter, S. Williams, M. Mcdonald, N. F. Johnson, and N. S. Jones. Temporal Evolution of Financial Market Correlations. arXiv, pp. 1-15, 2011.
D. K. Foot and W. J. Milne. Net migration estimation in an extended, multiregional gravity model. Journal of regional science, 24(1):119-33, Feb. 1984.
J. Friedman, T. Hastie, and R. Tibshirani. Sparse inverse covariance estimation with the graphical lasso. Biostatistics (Oxford, England), 9(3):432-41, Jul. 2008.
V. Guttal and C. Jayaprakash, Spatial variance and spatial skewness: leading indicators of regime shifts in spatial ecological systems, Theoretical Ecology, 2009.
R. M. May, S. A. Levin, and G. Sugihara. Ecology for Bankers. Nature, 451(February):893-895, 2008.
P. N. McGraw and M. Menzinger, Analysis of nonlinear synchronization dynamics of oscillator networks by Laplacian spectral methods, Physical Review E 75, 2007.
P. E. McSharry, L. a. Smith, and L. Tarassenko. Prediction of epileptic seizures: Are nonlinear methods relevant? Nature medicine, 9(3):241-2; author reply 242, Mar. 2003.

(56) References Cited

OTHER PUBLICATIONS

H. Moon and T.-C. Lu. Early warning signal of complex systems: Network spectrum and critical transitions. Workshop on Information in Networks, Apr. 2010.

Moran. Notes on Continuous Stochastic Phenomena. Biometrika, 37(1):17-23, 1950.

M. Schefler, J. Bascompte, W. a. Brock, V. Brovkin, S. R. Carpenter, V. Dakos, H. Held, E. H. van Nes, M. Rietkerk, and G. Sugihara. Early-warning signals for critical transitions. Nature, 461(7260): pp. 53-59, Sep. 2009.

M. Schefler and S. R. Carpenter. Catastrophic regime shifts in ecosystems: linking theory to observation. Trends in Ecology & Evolution, 18(12):648-656, Dec. 2003.

Stomakhin, M. B. Short, and L. Bertozzi. Reconstruction of Missing Data in Social Networks Based on Temporal Patterns of Interactions. 2011.

H. van Nes and M. Schefler. Implications of Spatial Heterogeneity for Catastrophic Regime Shifts in Ecosystems. Ecology, 86(7):1797-1807, Jul. 2005.

L.M. Pecora and T.L. Carroll, Master Stability Functions for Synchronized Coupled Systems, Phys. Rev. Lett. 1998.

J. Yu, V. A. Smith, P. P. Wang, A. J. Hartemink, and E. D. Jarvis. Advances to Bayesian network inference for generating causal networks from observational biological data. Bioinformatics (Oxford, England), 20(18):3594-603, Dec. 2004.

N. L. Zhang and D. Poole. Exploiting Causal Independence in Bayesian Network Inference. Artificial Intelligence, 5:301-328,1996.

Ryan Compton, Hankyu Moon and Tsai-Ching Lu, \Catastrophe prediction via estimated network autocorrelation, WIN Workshop on Information in Networks, Sep. 2011.

Achlioptas, D.; D'Souza, R. M. & Spencer, J., Explosive Percolation in Random Networks, Science, 2009, 323, 1453-1455.

Buldyrev, S. V.; Parshani, R.; Paul, G.; Stanley, H. E. & Havlin, S., Catastrophic Cascade of Failures in Interdependent Networks, Nature, 2010, 464, 1025-1028.

da Costa, R. A.; Dorogovtsev, S. N.; Goltsev, A. V. & Mendes, J. F. F. Explosive Percolation Transition is Actually Continuous Phys. Rev. Lett., 2010, 105, 255701.

Crucitti, P.; Latora, V. & Marchiori, M., Model for Cascading Failures in Complex Networks, Phys. Rev. E, 2004, 69, 045104.

Erdös, P. & Rényi, A., On Random Graphs, I., Publicationes Mathematicae, 1959, 6, 290-297.

Kinney, R.; Crucitti, P.; Albert, R. & Latora, V., Modeling Cascading Failures in the North American Power Grid, Eur. Phy. J. B, 2005, 46, 101-107.

Moon, H. and Lu, T-C, Early Warning Signals of Complex Systems: Network Spectrum and Critical Transition, Workshop on Information in Networks, WIN 2010.

Riordan, O. & Wamke, L., Achlioptas Process Phase Transitions are Continuous, 2011, arXiv:1102.5306v2.

Scheffer, M.; Bascompte, J.; Brock, W. A.; Brovkin, V.; Carpenter, S. R.; Dakos, V.; Held, H.; van Nes, E. H.; Rietkerk, M. & Sugihara, G., Early Warning Signals for Critical Transitions, Nature, 2009, 461, 53-59.

Schreiber, T., Measuring Information Transfer, in Phys. Rev. Lett., 2000.

Lizier, J. T., The Local Information Dynamics of Distributed Computation in Complex Systems, Ph. D. thesis, University of Sidney, 2010.

D. Harmon, M De Aguitar, D. Chinellato, D. Braha, R.R. Epstein, and Y. Bar-Yam, Predicting economic market crises using measures of collective panic, Arxiv.org, 2011.

Office Action 1 for U.S. Appl. No. 13/748,223, dated Jan. 12, 2016.
Response to Office Action 1 for U.S. Appl. No. 13/748,223, dated Apr. 12, 2016.
Office Action 2 for U.S. Appl. No. 13/748,223, dated Jul. 14, 2016.
Response to Office Action 2 for U.S. Appl. No. 13/748,223, dated Nov. 14, 2016.

G. Holland and N. Vaidya, "Analysis of TCP performance over mobile ad hoc networks," in Proceedings of the 5th annual ACM/IEEE international conference on Mobile computing and networking, ser. MobiCom '99. New York, NY, USA: ACM, 1999, pp. 219-230. [Online]. http://doi.acm.org/10.1145/313451.313540.

Y.-Y. Liu, et al., "Controllability of complex networks," Nature, vol. 473, pp. 167-173, 2011.

Yang-Yu Liva, Jean-Jacques Slotinef, and Albert-László Barabásia, "The observability of complex systems," PNAS, vol. 110, No. 7, pp. 2460-2465, 2013.

K.-Y. Ni and T.-C. Lu, "Information dynamic spectrum predict critical transitions," in Proceedings of 2nd International Conference on Complex Sciences: Theory and Applications (COMPLEX 2012), Santa Fe, New Mexico, Dec. 2012, pp. 267-280.

A. Josang, "An algebra for assessing trust in certification chains," in J. Kochmar, editor, Proceedings of the network and Distributed Systems Security Symposium (NDSS'99), The Internet Society, 1999.

C. Nicolaides, L. Cueto-Felgueroso, M. C. González, and R. Juanes, "A metric of influential spreading during contagion dynamics through the air transportation network," PLOS one, vol. 7, No. 7, e40961, 2012.

J.-P. Hubaux, L. Buttyán, and S. Capkun, "The quest for security in mobile ad hoc networks," in Proceedings of the 2nd ACM international symposium on Mobile ad hoc networking & computing. ACM, 2001, pp. 146-155.

S. Marti, T. J. Giuli, K. Lai, M. Baker et al., "Mitigating routing misbehavior in mobile ad hoc networks," in International Conference on Mobile Computing and Networking: Proceedings of the 6 th annual international conference on Mobile computing and networking, vol. 6, No. 11, 2000, pp. 255-265.

H. Yang, J. Shu, X. Meng, and S. Lu, "Scan: self-organized network-layer security in mobile ad hoc networks," Selected Areas in Communications, IEEE Journal on, vol. 24, No. 2, pp. 261-273, 2006.

Y. Zhang, et al., "Security in mobile ad-hoc networks," in Ad Hoc Networks, Springer, 2005, pp. 249-268.

K. Govindan and P. Mahapatra, "Trust computations and trust dynamics in mobile adhoc networks: A survey," Communications Surveys & Tutorials, IEEE, vol. 14, No. 2, pp. 279-298, 2012.

A. Jøsang, R. Ismail, and C. Boyd, "A survey of trust and reputation systems for online service provision," Decision support systems, vol. 43, No. 2, pp. 618-644, 2007.

P. Michiardi, et al., "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.

S. Noel, et al., "Advances in topological vulnerability analysis," in Conference for Homeland Security, 2009. CATCH'09. Cybersecurity Applications & Technology. IEEE, 2009, pp. 124-129.

M. Kurant, et al., "Layered complex networks," Physical review letters, vol. 96, No. 13, pp. 138701-1-138701-4, 2006.

S. V. Buldyrev, R. Parshani, G. P. H. E. Stanley, and S. Havlin, "Catastrophic cascade of failures in interdependent networks," Nature, vol. 464, No. 7291, pp. 1025-1028, 2010.

Extendable Mobile Ad-hoc Network Emulator (EMANE). Naval Research Laboratory, Networks and Comm. Systems Branch. [Online] http://cs.itd.nrl.navy.mil/work/emane/, taken on Jan. 26, 2015.

J. Gao, et al., "Networks formed from interdependent networks," Nature Physics, vol. 8, No. 1, pp. 40-48, 2011.

K. E. Defrawy and G. Tsudik, "Anonymous location aided routing in suspicious MANETs," IEEE Transactions on Mobile Computing (IEEE TMC), vol. 10, No. 9,pp. 1345-1358, Sep. 2011.

Y. Kong, "Resilience to degree-dependent and cascading node failures in random geometric networks," IEEE Transactions on Information Theory, vol. 56, No. 11, pp. 5533-5546, 2010.

NS-3 discrete-event network simulator. [Online] http://www.nsnam.org/ , taken Feb. 2015.

N. C. Valler, B. A. Prakash, H. Tong, M. Faloutsos, and C. Faloutsos, "Epidemic spread in mobile ad hoc networks: Determining the tipping point," in Proceedings of the 10th international IFIP TC 6 conference on Networking—Volume Part I, ser. Network-

(56) References Cited

OTHER PUBLICATIONS ing'11. Berlin, Heidelberg: Springer-Verlag, 2011, pp. 266-280. [Online] http://dl.acm.org/citation.cfm?id=2008780.2008807.
G. Holland and N. Vaidya, "Analysis of TCP performance over mobile ad hoc networks," in Proceedings of the 5th annual ACM/IEEE international conference on Mobile computing and networking, ser. MobiCom '99. New York, NY, USA: ACM, 1999, pp. 219-230.
Yang-Yu Liu, et al., "The observability of complex systems," PNAS, vol. 110, No. 7, pp. 2460-2465, 2013.
A. Jøsang, "An algebra for assessing trust in certification chains," in Proceedings of the Network and Distributed Systems Security Symposium (NDSS'99). The Internet Society, 1999.
C. Nicolaides, L. Cueto-Felgueroso, M. C. González, and R. Juanes, "A metric of influential spreading during contagion dynamics through the air transportation network," PLOS one, vol. 7, No. 7, 2012, pp. e40961-1-e40961-10.
P. Michiardi and R. Molva, "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.
S. Noel, M. Elder, S. Jajodia, P. Kalapa, S. O'Hare, and K. Prole, "Advances in topological vulnerability analysis," in Conference for Homeland Security, 2009. Catch'09. Cybersecurity Applications & Technology. IEEE, 2009, pp. 124-129.
T. Karagiannis, K. Papagiannaki, and M. Faloutsos, "Blinc: multi-level traffic classification in the dark," in ACM SIGGCOMM Computer Communication Review, vol. 35, No. 4. ACM, 2005, pp. 229-240.
M. Kurant and P. Thiran, "Layered complex networks," Physical review letters, vol. 96, No. 13, pp. 138701-1-138701-4, 2006.
Extendable Mobile Ad-hoc Network Emulator (EMANE). Naval Research Laboratory, Networks and Communications Systems Branch, pp. 1-3, downloaded Mar. 28, 2016, Available: http://cs.itd.nrl.navy.mil/-work/emane/.
J. Gao, S. V. Buldyrev, H. E. Stanley, and S. Havlin, "Networks formed from interdependent networks," Nature Physics, vol. 8, No. 1, pp. 40-48, 2011.
K. E. Defrawy and G. Tsudik, "Anonymous location aided routing in suspicious MANETs," IEEE Transactions on Mobile Computing (IEEE TMC), vol. 10, No. 9, pp. 1345-1358, Sep. 2011.
Ns-3 discrete-event network simulator, downloaded Mar. 25, 2016, pp. 1-2, available: http://www.nsnam.org/.
N. C. Valler, B. A. Prakash, H. Tong, M. Faloutsos, and C. Faloutsos, "Epidemic spread in mobile ad hoc networks: determining the tipping point," in Proceedings of the 10th international IFIP TC 6 conference on Networking—Volume Part I, ser. Networking'11. Berlin, Heidelberg: Springer-Verlag, 2011, pp. 266-280.
Wernicke, Sebastian. "Efficient Detection of Network Motifs." IEEE/ACM Trans. Computational Biol. Bioinformatics 3, No. 4 (Oct. 2006): pp. 347-359. doi:10.1109/TCBB.2006.51.
Ribeiro, Pedro, and Fernando Silva. "G-Tries: An Efficient Data Structure for Discovering Network Motifs." In proceedings of the 2010 ACM Symposium on Applied Computing, pp. 1559-1566. SAC '10. New York, NY, USA: ACM, 2010. doi:10.1145/1774088.1774422.
McKay, Brendan D. "Isomorph-Free Exhaustive Generation." Journal of Algorithms 26, No. 2 (Feb. 1998): pges 306-234. doi:10_1006/jagm.1997.0898.
Notification of Transmittal of International Search Report and the Written Opinion of the International Searching Authority for PCT/US2016/023307; dated Dec. 22, 2016.
International Search Report of the International Searching Authority for PCT/US2016/023307; dated Dec. 22, 2016.
Written Opinion of the International Searching Authority for PCT/US2016/023307; dated Dec. 22, 2016.
O. Kwon and J.-S. Yang, Information Flow between Stock Indices, (2008) EPL 82 68003.

H. Moon and T.-C. Lu, Early Warning Signal of Complex Systems: Network Spectrum and Critical Transitions, WIN (2010).
H. Moon and T.-C. Lu, Network Catastrophe: Self-Organized Patterns Reveal both the Instability and the Structure of Complex Networks, preprint, (2012).
M. Staniek and K. Lehnertz, Symbolic Transfer Entropy, Physical Review Letters 100, 15801, (2008).
M. Scheffer, J. Bascompte, W.A. Brock, V. Brovkin, S.R. Carpenter, V. Dakos, H. Held, E.H. van Nes, M. Rietkerk, and G. Sugihara, Early-warning signals for critical transitions. Nature, 461, (2009).
T. Schreiber, Measuring Information Transfer, Phys. Rev, Lett. 85, 461, (2000).
PCT International Search Report and the Written Opinion of the International Searching Authority for PCT/US2014/026469, dated Jul. 25, 2014.
Lungarella, et al., "Information transfer at multiple scales," Physical Review E. No. 76, pp. 1-10, Nov. 27, 2007.
Lindner, et al., "Trentool: A Mat lab open source toolbox to analyse information flow in time series data with transfer entropy," BMC Neuroscience, pp. 1-22, Nov. 18, 2011.
Runge, et al., "Quantifying causal coupling strength: A lag-specific measure for multivariate time series related to transfer entropy," Physical Review E. pp. 1-15, Nov. 21, 2012.
Office Action 1 for U.S. Appl. No. 14/209,314, dated May 19, 2016.
Wang, Chaoili, "Analyzing information transfer in time-varying multivariate data". 2011 IEEE Pacific Visualization, Mar. 1, 2011 Symposium, pp. 99-106.
Weisstein, Eric W. "Least Squares Fitting—Logarithmic." From MathWorld—A Wolfram Web Resource. http://mathworld.wolfram.com/LeastSquaresFittingLogarithrnic.html, Downloaded Apr. 25, 2017.
Wikipedia-Derivative, "https://web.archive.org/web/2011 0302203056/ http:len.wikipedia.org/wiki/Derivative", Wayback Machine Derivative Wikipedia, Mar. 2, 2011.
Wikipedia-Finite-Difference-Method, "https://web.archive.org/web/ 201 00331172231 /http://en.wikipedia.org/wiki/Finite_difference_method", Wayback Machine Finite Difference Method Wikipedia, Mar. 31, 2010.
Wikipedia-Least-Squares., "https://web.archive.org/web/2011 0304153506/http:/len.wikipedia.org/wiki/Least_squares", Wayback Machine Least-Squares Wikipedia, Mar. 4, 2011.
Response to Office Action 1 for U.S. Appl. No. 14/209,314, dated Aug. 18, 2016.
Office Action 2 for U.S. Appl. No. 14/209,314, dated Sep. 8, 2016.
Response to Office Action 2 for U.S. Appl. No. 14/209,314, dated Dec. 8, 2016.
Notification Concerning Transmittal of International Preliminary Report on Patentability for PCT/US2016/023308; dated Sep. 28, 2017.
International Preliminary Report on Patentability for PCT/US2016/023308; dated Sep. 28, 2017.
CERT US Secret Service and Deloitte. 2010 cybersecurity watch survey. CSO magazine, 2010.
David Allen, Tsai-Ching Lu, and David Huber. Detecting and analyzing relationships among anomalies. In IEEE VAST, 2009.
Michael McCormick. Data theft: a prototypical insider threat. In S. Stolfo et al. (Ed.), Insider Attack and Cyber Security, pp. 53-680. Springer, 2008.
2006 E-Crime Watch Survey CSO Magazine with U.S. Secret Service, CERT Coordination Center, and Microsoft Corp.
Brian Bowen, Malek Ben Salem, Shlomo Hershkop, Angelos Keromytis, Salvatore Stolfo. Designing Host and Network Sensors to Mitigate the Insider Threat. IEEE Security and Privacy, pp. 22-29, Nov./Dec. 2009.
Robert H. Anderson, Thomas Bozek, Tom Langstaff, Wayne Meitzler, Michael Skroch, and Ken Van Wyk. Research on mitigating the insider threat to information systems-#2, RAND Conference Proceedings, 2000.
D. Caputo, M. Maloof, and G. Stephens. Detecting the theft of trade secrets by insiders: a summary of MITRE insider threat research. IEEE Security & Privacy, Fall 2009.

(56) References Cited

OTHER PUBLICATIONS

Felicia Duran, Stephen H. Conrad, Gregory N. Conrad, David P. Duggan, and Edward Bruce Held. Building a system for insider security. IEEE Security and Privacy, pp. 30-38, Nov./Dec. 2009.
M. Keeney, E. Kowalski, D/ Cappelli, A. Moore, T. Shimeall, and S. Rogers. Insider threat study: computer system sabotage in critical infrastructure sectors. Joint SEI and U.S. Secret Service Report, 2005.
Adam Barth, Benjamin Rubinstein, Mukund Sundararajan, John Mitchell, Dawn Song, and Peter Bartlett. A learning-based approach to reactive security. In Proc. of the 14th International Conference on Financial Cryptography and Data Security, 2010.
Ya'akov Gal and Avi Pfeffer. Networks of influence diagrams: a formalism for reasoning about agents' decision-making processes. Journal of Artificial Intelligence Research 33, pp. 109-147, 2008.
Gérard Wagener, Radu State, Alexandre Dulaunoy, and Thomas Engel. Self adaptive high interaction honeypots driven by game theory. In SSS '09: Proceedings of the 11th International Symposium on Stabilization, Safety, and Security of Distributed Systems, pp. 741-755, Berlin, Heidelberg, 2009. Springer-Verlag.
Changhe Yuan, Xiaolu Liu, Tsai-Ching Lu, and Heejin Lim. Most relevant explanation: Properties, algorithms, and evaluations. In Proceeding of the 25th Conference on Uncertainty in Artificial Intelligence (UAI 2009), 2009.
Aaron Clauset, Cristopher Moore, and M. E. J. Newman. Hierarchical structure and the prediction of missing links in networks. Nature, 453 (7191): 98-101, 2008.
B. Davison and H. Hirsh. Predicting Sequences of User Actions. AAAI-98 Workshop, 1998.
Steven McKinney. Insider threat: user identification via process profiling. Ph.D. thesis, NCSU, 2008.
N. Nguyen, P. Reiher, and G.H. Kuenning. Detecting insider threats by monitoring system call activity. IEEE Information Assurance Workshop, United States Military Academy West Point, New York, 2003.
Malek Ben Salem, Shlomo Hershkop, and Salvatore Stolof, A Survey of Insider Attack Detection Research. In S. Stolfo et al. (Ed.), Insider Attack and Cyber Security, pp. 69-90. Springer, 2008.
Mikhail Belkin and Partha Niyogi. Laplacian Eigenmaps for dimensionality reduction and data representation. In Neural Computation, vol. 15, 2003.
N. Marwan, M.C. Romano, M. Thiel, and J. Kurths. Recurrence plots for the analysis of complex systems. In Physics Reports, 438, 237-329.
Malek Ben Salem and Salvatore Stolfo. Detecting Masqueraders: A Comparison of One-Class Bag-of-Words User Behavior Modeling Techniques. In Proceedings of the Second International Workshop on Managing Insider Security Threats, 2010.
M. Scheffer, J. Bascompte, W.A. Brock, V. Brovkin, S.R. Carpenter, V. Dakos, H. Held, E.H. van Nes, M. Rietkerk, and G. Sugihara. Early-warning signals for critical transitions. Nature, 461: 53-59, 2009.
O. Kwon and J.-S. Yang, Information Flow between Stock Indices, 2008 EPL 82 68003.
M. Staniek and K. Lehnertz, Symbolic Transfer Entropy, Physical Review Letters 100, 15801, 2008.
M. Scheffer, J. Bascompte, W.A. Brock, V. Brovkin, S.R. Carpenter, V. Dakos, H. Held, E.H. van Nes, M. Rietkerk, and G. Sugihara, Early-warning signals for critical transitions. Nature, 461, 2009.
T. Schreiber, Measuring Information Transfer, Phys. Rev, Lett. 85, 461, 2000.
K.-Y. Ni and T.-C.Lu, Detection and Identification of Directional Influences using Information Dynamic Spectrum, Proceedings of the 4th Workshop on Information in Networks, 2012.
D. Cappelli, R. Trzeciak, and R. Floodeen. "The Key to Successful Monitoring for Detection of Insider Attacks," presented at RSA Conference 2010, Mar. 2010.
2010 CyberSecurity Watch Survey, www.cert.org/archive/pdf/ecrimesummary10.pdf.
T. Kolda and B. Bader. "Tensor Decompositions and Applications," in SIAM Review, Jun. 2008.
J. Sun, D. Tao, S. Papadimitriou, P. Yu, and C. Faloutsos, "Incremental Tensor Analysis: Theory and Applications," in ACM Transactions on Knowledge Discovery from Data, vol. 2, No. 3, Oct. 2008.
National Research Council. "Network Science," The National Academies Press, 2005.
Charles Pfleeger. Reflections on the Insider Threat. In S. Stolfo et al. (Ed.), Insider Attack and Cyber Security, pp. 5-15. Springer, 2008.
Michael McCormick. Data theft: a prototypical insider threat. In S. Stolfo et al. (Ed.), Insider Attack and Cyber Security, pp. 53-68. Springer, 2008.
M. Scheffer, J. Bascompte, W.A. Brock, V. Brovkin, S.R. Carpenter, V. Dakos, H. Held, E.H. van Nes, M. Rietkerk & G. Sugihara, Early-warning signals for critical transitions. Nature, 461: 53-59, 2009.
V. Dakos, E H. van Nes, R. Donangelo, H. Fort, and M. Scheffer (in press). Spatial correlation as leading indicator of catastrophic shifts. Theoretical Ecology, 2009.
Hankyu Moon and Tsai-Ching Lu. Early warning signal of complex systems: Network spectrum and critical transitions. In Workshop on Information in Networks (WIN), 2010.
H. Moon and T.-C. Lu, Network Catastrophe: Self-Organized Patterns Reveal both the Instability and the Structure of Complex Networks, preprint, 2012.
Office Action 1 for U.S. Appl. No. 13/904,945, dated Oct. 7, 2016.
Wang, Chaoili, "Analyzing information transfer in time-varying multivariate data". 2011 IEEE Pacific Visualization, Mar. 1-4, 2011 Symposium, pp. 99-106.
Zennaro, Marino. "Stability of linear problems: joint spectal radius of sets of matrices"., Lecture 1, CIME-EMS Summer School in Applied Mathematics Jun. 27-Jul. 2, 2011—Cetraro (CS), Italy.
Response to Office Action 1 for U.S. Appl. No. 13/904,945, dated Jan. 9, 2017.
Notification Concerning Transmittal of International Preliminary Report on Patentability for PCT/US2016/023307; dated Sep. 28, 2017.
International Preliminary Report on Patentability for PCT/US2016/023307; dated Sep. 28, 2017.
Notice of Allowance for U.S. Appl. No. 15/075,052, dated Jan. 25, 2018.
Office Action 3 for U.S. Appl. No. 13/748,223, dated Jun. 13, 2017.
Response to Office Action 3 for U.S. Appl. No. 13/748,223, dated Sep. 13, 2017.
Office Action 4 for U.S. Appl. No. 13/748,223, dated Nov. 24, 2017.
Wikipedia: Tell-Tale (Automotive); <https://web.archive.org/web/20111105030402/https://en.wikipedia.org/wiki/Idiot_light> retrieved by archive.org on Nov. 11, 2011.
Peter H Jesty & Keith M Hobley, Safety Analysis of Vehicle-Based Systems, Retrieved From: <http://citeseerx.ist.psu.edu/viewdoc/download?D01=1 0.1.1.114.4318&rep=rep1 & type=pdf>on Nov. 14, 2017 (2000)[Hereinafter "JESTY"].
Response to Office Action 4 for U.S. Appl. No. 13/748,223, dated Mar. 26, 2018.
Office Action 3 for U.S. Appl. No. 14/209,314, dated Jun. 16, 2017.
Response to Office Action 3 for U.S. Appl. No. 14/209,314, dated Sep. 15, 2017.
Office Action 4 for U.S. Appl. No. 14/209,314, dated Nov. 2, 2017.
Response to Office Action 4 for U.S. Appl. No. 14/209,314, dated Mar. 2, 2018.
Office Action 2 for U.S. Appl. No. 13/904,945, dated May 5, 2017.
Response to Office Action 2 for U.S. Appl. No. 13/904,945, dated Jul. 26, 2017.
Office Action 3 for U.S. Appl. No. 13/904,945, dated Sep. 21, 2017.
Response to Office Action 3 for U.S. Appl. No. 13/904,945, dated Dec. 20, 2017.
Notification Concerning Transmittal of International Preliminary Report on Patentability for PCT/US2014/028469; dated Sep. 24, 2015.
International Preliminary Report on Patentability for PCT/US2014/026469; dated Sep. 24, 2015.
Office Action 1 for U.S. Appl. No. 14/625,988, dated Apr. 26, 2017.

(56) References Cited

OTHER PUBLICATIONS

Chinese Patent CN105122004B, granted Nov. 28, 2017.
Response to European Search Report for European Regional Phase Patent Application No. 14775044.2, dated May 10, 2017.

* cited by examiner

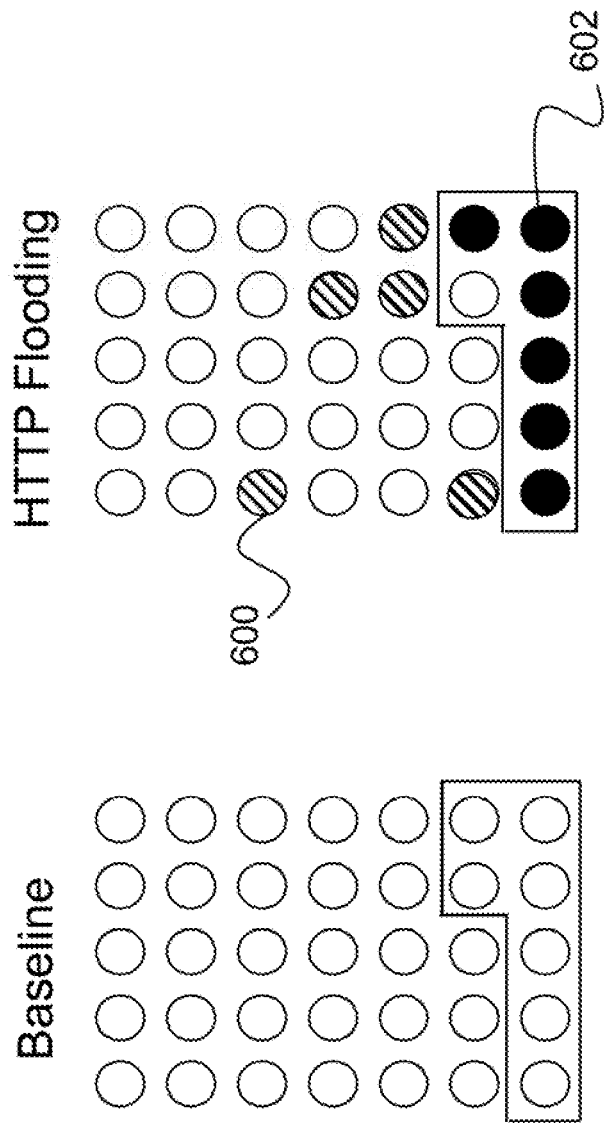

SYSTEM AND METHOD TO DETECT ATTACKS ON MOBILE WIRELESS NETWORKS BASED ON NETWORK CONTROLLABILITY ANALYSIS

CROSS-REFERENCE TO RELATED APPLICATIONS

This is a Continuation-in-Part Application of U.S. application Ser. No. 14/625,988, filed on Feb. 19, 2015, entitled, "System and Method for Determining Reliability of Nodes in Mobile Wireless Network," which is a Non-Provisional Patent Application of U.S. Provisional Application No. 61/941,893, filed on Feb. 19, 2014, entitled, "System and Method to Quantify Reliability of Nodes in Mobile Wireless Networks," the entirety of which are incorporated by reference. U.S. application Ser. No. 14/625,988 is also a Continuation-in-Part Application of U.S. application Ser. No. 14/209,314, filed on Mar. 13, 2014, entitled, "Predicting System Trajectories Toward Critical Transitions," which is a Continuation-in-Part Application of U.S. application Ser. No. 13/904,945, filed on May 29, 2013, entitled, "Detection and Identification of Directional Influences Using Dynamic Spectrum," the entirety of which are incorporated herein by reference. U.S. application Ser. No. 14/209,314 is a Non-Provisional Patent Application of U.S. Provisional Application No. 61/784,167, filed on Mar. 14, 2013, entitled, "Predicting System Trajectories Toward Critical Transitions," the entirety of which are incorporated herein by reference. U S. application Ser. No. 13/904,945 is a Continuation-in-Part Application of U.S. application Ser. No. 13/748,223, filed on Jan. 23, 2013, entitled, "Early Warning Signals of Complex Systems," which is a Non-Provisional Patent Application of U.S. Provisional Application No. 61/589,634, filed on Jan. 23, 2012, entitled, "Early Warning Signals of Complex Systems," and U.S. Provisional Application No. 61/589,646, filed on Jan. 23, 2012, entitled, "System and Method for Cyber Infrastructure Protection from Insider Threats," the entirety of which are incorporated herein by reference. U.S. application Ser. No. 13/904,945 is also a Non-Provisional Patent Application of U.S. Provisional Application No. 61/694,510, filed on Aug. 29, 2012, entitled, "Detection and Identification of Directional. Influences Using Dynamic Spectrum," the entirety of which are incorporated herein by reference.

This is ALSO a Non-Provisional Patent Application of U.S. Provisional Patent Application No. 62/135,142 filed Mar. 18, 2015, entitled, "System and Method to Detect Attacks on Mobile Wireless Networks Based on Network Controllability Analysis," the entirety of which is incorporated herein by reference.

This is ALSO Non-Provisional Patent Application of U.S. Provisional Patent Application No. 62/135,136 filed Mar. 18, 2015, entitled, "System and Method to Detect Attacks on Mobile Wireless Networks Based on Motif Analysis," the entirety of which is incorporated herein by reference.

GOVERNMENT LICENSE RIGHTS

This invention was made with government support under U.S. Government Contract Number AFRL FA8750-14-C-0017. The government has certain rights in the invention.

BACKGROUND OF INVENTION

(1) Field of Invention

The present invention relates to a system for detecting attacks on nodes of wireless networks and, more particularly, to a system for detecting attacks on nodes of wireless networks based on network controllability analysis.

(2) Description of Related Art

Due to the dynamic nature of mobile wireless network topology, mobile wireless networks use protocols that are built on a model of implicit trust and sharing of control information, which makes them particularly hard to defend against attacks of misinformation. Existing security solutions for mobile adhoc networks detect attacks at the level of networks throughput statistics (e.g., at layer 2 and 3 of the 7-layer network stack) by anomaly detection. They look for protocol violations; hence, they are specific to certain protocols or known attack signatures. Additionally, current network protocol stacks secure the transmission between pairs of nodes, hut they can't avoid reliance on the information from other nodes (i.e., they can't avoid "network insider" attacks). A compromised node can send bad information to subvert the operation of the network (e.g., by advertising itself as the fastest route to get to every other node in the network, but throwing away every packet it gets, called a blackhole attack). This kind of attack does not violate protocol, so it is hard to detect with conventional techniques.

Furthermore, current research in the detection of misbehaving nodes in mobile wireless networks is still predominantly focused on adapting and optimizing conventional network defense strategies that concentrate on behaviors at the lower layers of the networking stack (see the List of incorporated Literature References, Literature Reference Nos. 3-9). Research on strategies such as signature detection, statistical anomaly detection, and specification-based detection have proven effective for specific attack and network scenarios, but applicability to more general scenarios has proven elusive. What has been missing is a higher level behavioral analysis of the entire networking stack and applications on each node and on the network as a whole. It is this perspective that recent research in network science and information dynamics can now provide through the formulation and analysis of the graph-theoretic network-of-networks (NoN) model (see Literature Reference Nos. 10-12). Although NoN has been widely applied to the study of the dynamics of social networks, its application to cyber-security has only recently been recognized following breakthroughs of methods for modeling both logical and physical networks in NoN (see Literature Reference No. 13), where connectivity and dynamics are fundamentally different. The extension of this ground breaking work to the challenging environment of mobile wireless networks, particularly under real-world assumptions of scale and complexity, has yet to be studied.

Thus, a continuing need exists for a system that can detect sources of misinformation in a holistic way by analyzing changes in applications and their dependencies with the lower networking layers.

SUMMARY OF THE INVENTION

The present invention relates to a system for detecting attacks on nodes of wireless networks and, more particularly, to a system for detecting attacks on nodes of wireless networks based on network controllability analysis. The system comprises one or more processors and a memory having instructions such that when the instructions are executed, the one or more processors perform multiple operations. A plurality of network controllability metrics on a representation of a communication network comprising a plurality of nodes are computed. Changes in the plurality of network controllability metrics are detected, the detected changes are used to detect attacks of misinformation on the communication network.

In another aspect, the representation includes network topology, network dependencies, and application dependencies within the communication network.

In another aspect, the plurality of network controllability metrics are computed as a function of a pattern of communication between a plurality of nodes of the communication network during a given time window.

In another aspect, given a set of examples of network controllability metric data representing a baseline behavior and a set of examples of network controllability metric data representing an attack behavior, a machine learning classifier determines a threshold for attack detection based on differences between the baseline behavior and the attack behavior.

In another aspect, each network controllability metric is represented as a diode in a diode pattern panel, wherein network controllability metrics displaying attack behavior, as determined by the threshold for attack detection, are highlighted in the diode pattern panel.

In another aspect, upon detection of an attack of misinformation on the communication network, the system performs a mitigation action.

In another aspect, the mitigation action comprises isolating an attacking node from the rest of the communication network.

In another aspect, the mitigation action comprises informing every other node in the communication network to ignore anything that the attacking node transmits, and not to send anything to, or through, the attacking node.

In another aspect, features representing each of the plurality of network controllability metrics are output. Each feature is then converted into a binary indication of whether a value is anomalous or not anomalous, and the binary indication is used to detect changes in the plurality of network controllability metrics.

In another aspect, the representation is, a graphical representation of network topology, network dependencies, and application dependencies within the communication network.

In another aspect, the plurality of network controllability metrics are computed on a graphical representation of a pattern of communication between a plurality of nodes of the communication network during a given time window.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6A is an illustration of a diode pattern of 35 network metrics for baseline activity according to some embodiments of the present disclosure;

FIG. 6B is an illustration of a diode pattern of 35 network metrics during a hypertext transfer protocol (HTTP) flooding attack according to some embodiments of the present disclosure;

DETAILED DESCRIPTION

Figure 1:
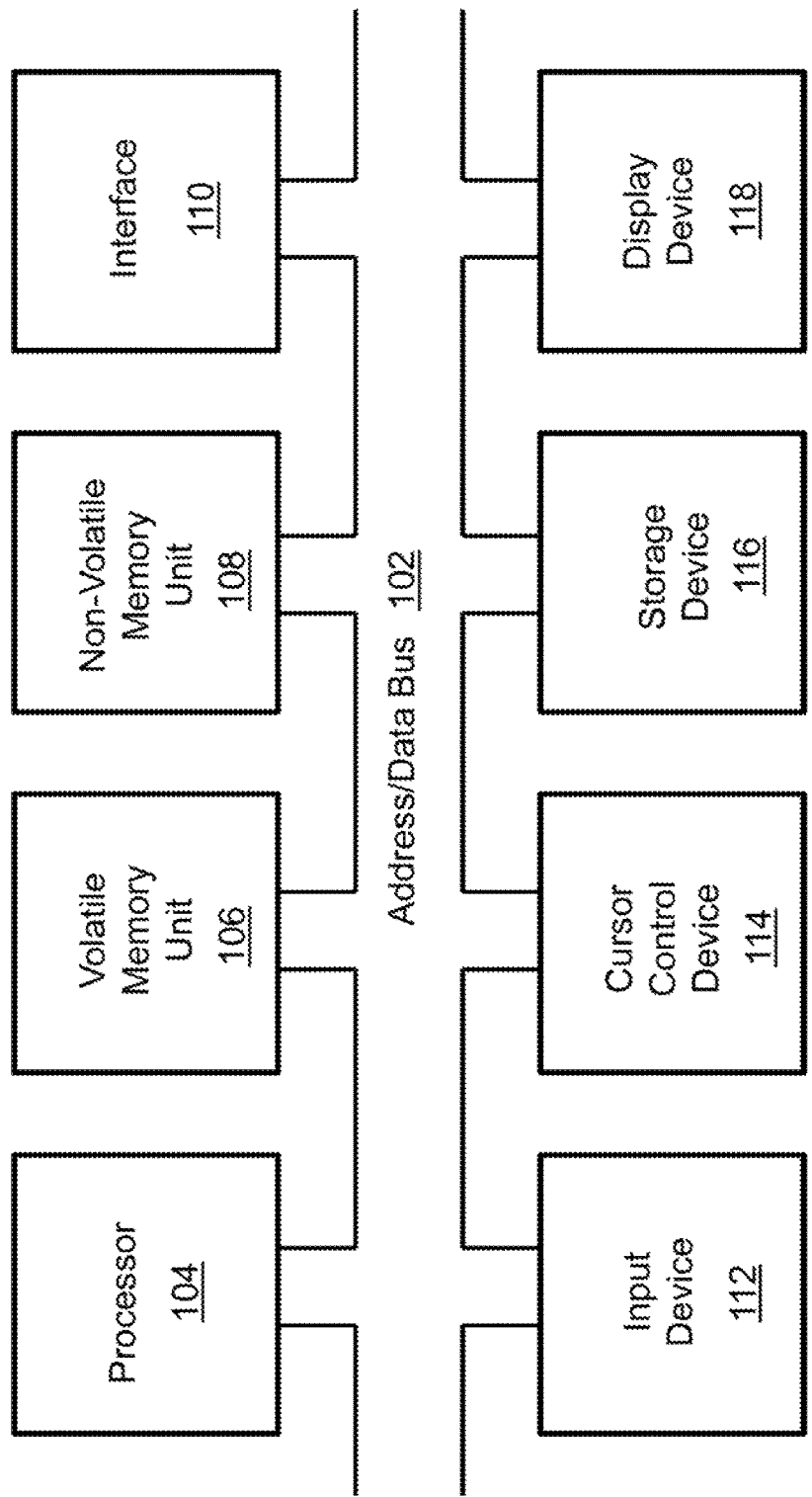
FIG. 1 is a block diagram depicting the components of a system for detecting attacks on wireless networks according to some embodiments of the present disclosure.

The present invention relates to a system for detecting attacks on nodes of wireless networks and, more particularly, to a system for detecting attacks on nodes of wireless networks based on network controllability analysis. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references as used in the description is provided. Next, a description of various principal aspects of the present invention is provided. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:
1. Y.-Y. Liu, J.-J. Slotine, and A.-L. Barabási, "Controllability of complex networks," *Nature*, vol. 473, pp. 167-173, 2011.
2. Y.-Y. Liu, J.-J. Slotine, and A.-L. Barabási "The observability of complex systems," PNAS, vol. 110, no. 7, pp. 2460-2465, 2013.
3. J.-P. Hubaux, L. Buttyán, and S. Capkun, "The quest for security in mobile ad hoc networks," in Proceedings of the 2nd ACM international symposium on Mobile ad hoc networking & computing. ACM, 2001, pp. 146-155.
4. S. Marti, T. J. Giuli, K. Lai, M. Baker et al., "Mitigating routing misbehavior in mobile ad hoc networks," in International Conference on Mobile Computing and Networking: Proceedings of the 6th annual international conference on Mobile computing and networking, vol. 6, no. 11, 2000, pp. 255-265.
5. H. Yang, J. Shu, X. Meng, and S. Lu, "Scan: self-organized network-layer security in mobile ad hoc networks," IEEE Journal on Selected Areas in Communications, vol. 24, no. 2, pp. 261-273, 2006.
6. Y. Zhang and W. Lee, "Security in mobile ad-hoc networks," in Ad Hoc Networks. Springer, 2005, pp. 249-268.
7. K. Govindan and P. Mohapatra. "Trust computations and trust dynamics in mobile adhoc networks: a survey," Communications Surveys & Tutorials, IEEE, vol. 14, no. 2, pp. 279-298, 2012.
8. A. Jøsang, R. Ismail, and C. Boyd, "A survey of trust and reputation systems for online service provision," Decision support systems, vol. 43, no. 2, pp. 618-644, 2007.
9. P. Michiardi and R. Molva, "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.
10. S. Noel, M. Elder, S. Jajodia, P. Kalapa, S. O'Hare, and K. Prole, "Advances in topological vulnerability analysis," in Conference For Homeland Security, 2009. CATCH'09, Cybersecurity Applications & Technology, IEEE, 2009, pp. 124-129.
11. T. Karagiannis, K. Papagiannaki, and M. Faloutsos, "Blinc: multilevel traffic classification in the dark," in ACM SIGCOMM Computer Communication Review, vol. 35, no. 4. ACM, 2005, pp. 229-240.
12. S. Noel and S. Jajodia, "Understanding complex network attack graphs through clustered adjacency matrices," in Computer Security Applications Conference, 21st Annual, IEEE, 2005, pp. 1-10.
13. M. Kurant and P. Thiran, "Layered complex networks," Physical review letters, vol. 96, no. 13, p. 138701, 2006.
14. Borgatti, S and M. Everett, "A graph-theoretic perspective on centrality," Social Networks, 28(4), 2006.

(2) PRINCIPAL ASPECTS

The present invention has three "principal" aspects. The first is a system for detecting attacks on wireless networks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data unit 106 wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. For example, the input device 112 may include one or more sensors, such as a camera for video or still images, a microphone, or a neural sensor. Other example input devices 112 may include an accelerometer, a GPS sensor, or a gyroscope.

In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
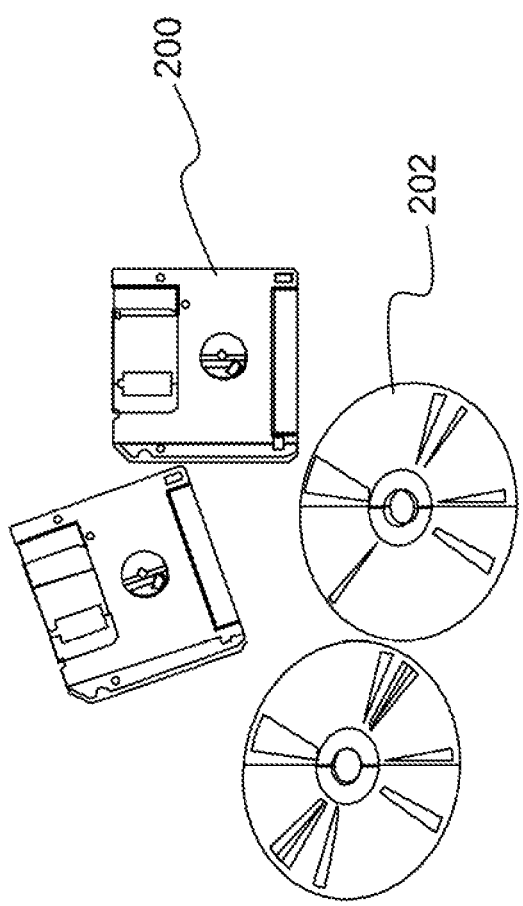
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF THE INVENTION

Described is a system to detect attacks on nodes of wireless networks. It leverages the system described in U.S. application Ser. No. 14/625,988 (incorporated herein by reference in its entirety), which abstracts the details of the network stack and the physical layer into a mathematical representation of the relationships between network elements and services called the eXploitation network (Xnet). Leveraging of Xnet makes it possible to go beyond conventional methods for wireless networks.

Existing security solutions for mobile adhoc networks detect attacks at the level of network throughput statistics (i.e., at layer 2 and 3 of the 7-layer network stack) by anomaly detection. They look for protocol violations; hence, they are specific to certain protocols or known attack signatures. The technique according to some embodiments of the present disclosure analyzes network behavior with a holistic approach, from layer 2 to layer 7, which means that it looks at changes in applications and their dependencies with the lower networking layers. In particular, it analyzes network state based on "network controllability" analysis, which computes the minimal set of nodes (referred to as driver nodes) that is required to control the state of the entire network, and how that set changes over time. This process of analyzing a wireless network is distinct from any previously described methods of analysis.

Due to the dynamic nature of mobile wireless network topology, current techniques use protocols that are built on a model of implicit trust and sharing of control information, which makes them particularly hard to defend against attacks of misinformation. For instance, current network protocol stacks secure the transmission between pairs of nodes, but they can't avoid reliance on the information from other nodes (i.e., they can't avoid "network insider" attacks). A compromised node can send bad information to subvert the operation of the network (e.g., by advertising itself as the fastest route to get to every other node in the network, but throwing away every packet it gets, called a blackhole attack). This kind of attack does not violate protocol, so it is hard to detect with conventional techniques. The approach described herein can detect sources of misinformation in a holistic way, especially when multiple nodes are compromised. This technique can identify dynamic structure dependency changes in Xnet that can signal suspicious nodes.

Broadly speaking, the system according to embodiments of the present disclosure falls into a class of intrusion detection systems (IDS). Current approaches include the following. Signature detection finds specific attack patterns known a priori, but this is ineffective against unknown attacks. With anomaly detection, effective classifiers are hard to construct due to network dynamics and have low to moderate accuracy. An immunology intrusion detection system learns to identify behaviors that are foreign, but this approach is protocol specific, hard to formulate, and has a high overhead. Extended finite state machine (FSM) models detect explicit violations in protocol state transitions, but this is protocol and implementation specific.

No other approach uses graph-theoretic and information dynamics analysis to identify misbehaving nodes. Rather than looking for specific attack signatures that are protocol specific or based on low-level network statistics, the invention described herein looks at a higher level of behavior.

As described above, the eXploitation Network (Xnet) is a hierarchical model of a network (a network of networks) that provides three different views of the network, linked together by directional links. The network may be wired or wireless, and the topology may change dynamically. That is, nodes in the network can move, changing their pattern of connectivity to other nodes (i.e., MANET: Mobile AdHoc Network). Its nodes include the physical radios communicating on the network as well as conceptual nodes that represent applications and network services. Edges between nodes are created whenever one of these nodes sends data to another (just the start and end node, not the intermediate nodes that forward the message datagrams). An edge exists until the message reaches its destination.

Figure 10:
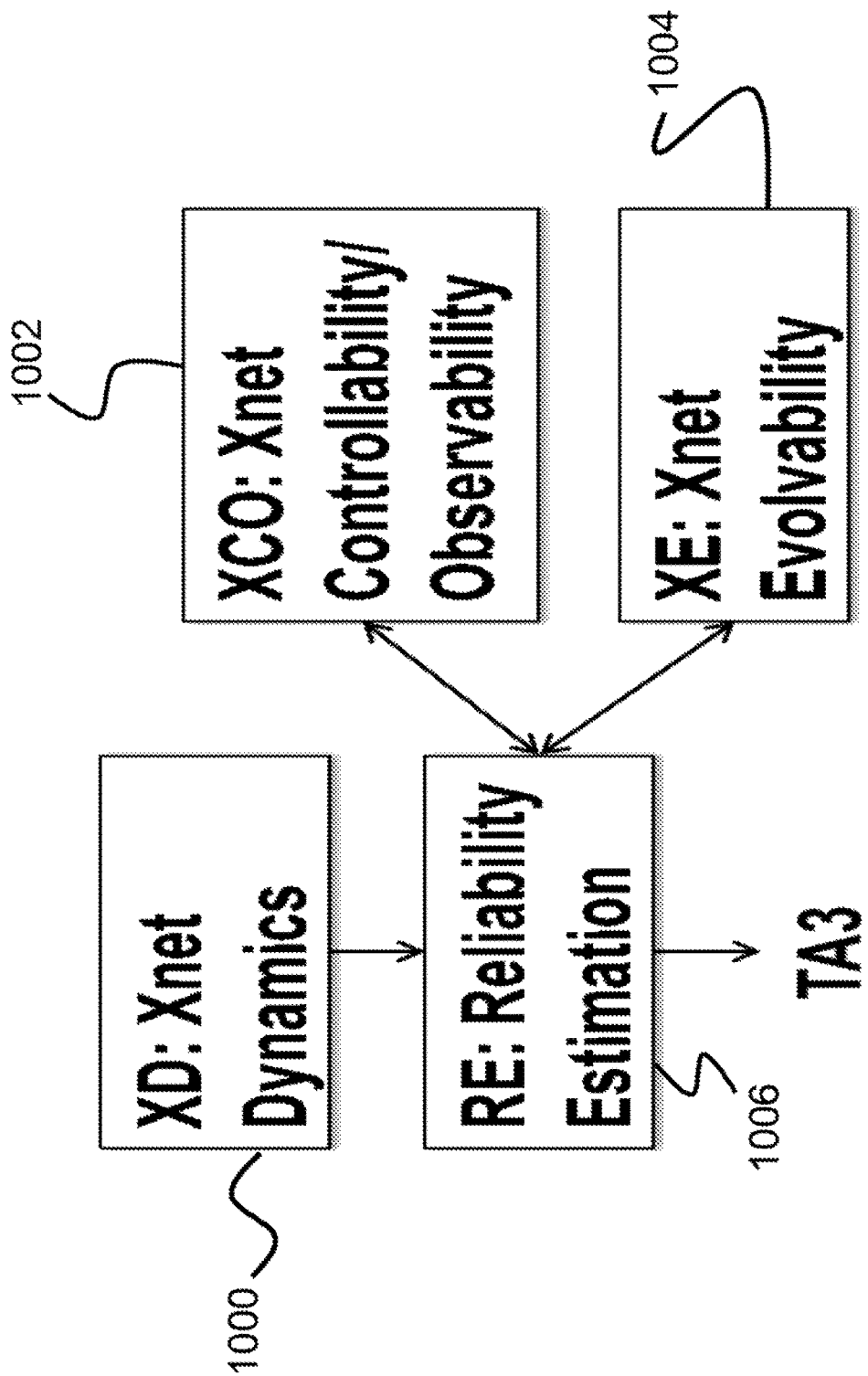
FIG. 10 is an illustration depicting a relationship between modules of the Xnet model according to some embodiments of the present disclosure.

As depicted in FIG. 10, the Xnet model includes at least four unique modules, including the Xnet Dynamics (XD)) module 1000, the Xnet Controllability/Observability (XCO) module 1002, the Xnet Evolvability (XE) module 1004, and (4) the Reliability Estimation (RE) module 1006. In various embodiments, different numbers of modules may be used to perform the same or similar functions. The XD module 1000 identifies unreliable nodes based on the dynamics of social networks (with no dependency on protocol) to indicate the presence of malicious or damaged nodes altering control and data plane information in the network. The XCO module 1002 identifies the optimal set of nodes required to passively monitor (observability) or actively probe (controllability) a suspected source of misinformation. These techniques require significantly fewer nodes (i.e., lower overhead than the prior art) to form a consensus on whether a suspected source of misinformation is malicious without compromising accuracy (increased probability of detection, lowered probability of false alarms). The XE module 1004 simulates a progression of failures to predict which nodes are most likely to be attacked next or should have trust reassessed. Finally, the RE module 1006 fuses cross-layer and cross-plane (control and data plane) information to identify suspicious nodes and improve reputation-based trust management. The unified trust metric is computed in a hybrid approach in which nodes combine normalized confidence and trust values based on direct experience and recommendations of other nodes. Such a hybrid approach avoids a centralized point of failure, ensures scalability, and renders the computation resilient to attacks targeting such computations. These modules are described in further detail below.

All modules communicate by annotations on Xnet. The XD module 1000 identifies nodes that appear to be misbehaving. The RE module 1006 gets a minimal set of driver and observer nodes from the XCO module 1002 for the suspect nodes. The RE module 1006 uses the driver nodes to do active probing on the suspect nodes, and the observer nodes update a trust metric with the results. The XE module 1004 simulates a spread of compromised nodes The RE module 1006 formalizes and quantifies trust using a model that relies on local computations based on direct interactions with neighbors and also by incorporating recommendations (and experiences) of other nodes. A formal subjective logic and trust model is leveraged for principled combination of evidence about how trustworthy a node is. Resilience to attacks is gained by adopting a hybrid distributed approach to compute trust, avoiding a single point of failure, and the approach is agnostic to control and/or data plane statistics being used. When the RE module's 1006 trust in a node falls below a certain level, it performs active probing on the node. To do that most efficiently the XCO module 1002 computes a minimal set of driver nodes to issue the challenges and observer nodes to observe the results.

The system also employs a two-pronged approach to discover sources of misinformation in the network, employing information dynamics identification of suspicious changes in Xnet dependencies, as well as trends in the appearance of such compromised nodes. First the XD module 1000 uses a unique information dynamic spectrum framework to predict system instability at critical transitions in complex systems, by analyzing Xnet time series data. This marks nodes for further inspection by the RE module 1006. Second, the XE module 1004 tracks trends in misbehaving nodes, and matches against simulations of contagion and cascading failures. The XE module 1004 will emit a confidence measure as to whether there is a pattern, and if so, the RE module 1006 can focus monitoring and testing resources on predicted next nodes to be attacked. System Administrators can use this information to focus preventative measures.

Network controllability analysis, described in further detail below, expands the scope of analysis beyond the node's immediate neighborhood to data based on indirect observations inferred from the direct data that it collects. For example, by monitoring the characteristics of the packets that a node handles it can infer architectural and dynamical properties of the larger network, such as the network size and dimension, and the dynamics of the communication patterns between nodes and reachability and connectivity.

The system described herein can be implemented in a wide variety of mobile wireless networks, non-limiting examples of which include mobile military and law enforcement networks (e.g., soldier-to-soldier, sensor-to-sensor, ground and aerial vehicle-to-vehicle); commercial vehicle-to-vehicle and vehicle-to-infrastructure networks (e.g., DSRC V2V/V2I, WiFi, active safety, infotainment); commercial mesh networks (metropolitan rooftop, WiMAX); and wireless infrastructure ISPs, cellular companies (e.g., extended data capacity). The system will significantly improve the security of these and other related networks, which currently rely predominantly on packet-level encryption to reduce the probability of external intrusion but do not detect or prevent "network insider" attacks. Specific details regarding the system are described in further detail below.

(3.1) Concept of Operation (3.1.1) Initialization Stage

During initialization, network administrators may configure each physical node of the network with compatible networking stacks, host and network services, applications, and other software necessary for the mission, including the proposed suite of modules with supporting configuration data. Then Xnet, the hierarchical representation of a communications network, may created, such as in the form of data tables that describe the applications and services that are running on the network, their inter-dependencies, and the observable characteristics of their behavioral dynamics under normal operation (e.g., node degree, traffic flow characteristics, topology). A Network Controllability (NC) code module (such as that referred to as XCO in U.S. patent application Ser. No. 14/625,988) receives the Application Dependency (AppDep) and Network Dependency (NetDep) graph from Xnet. For further details regarding Xnet, refer to U.S. patent application Ser. No. 14/625,988, which is hereby incorporated by reference in its entirety.

(3.1.2) Network Updates

While the analysis is in operation, public domain tools, such as NSDMiner (a technique for automatically discovering: network service dependencies from passively observed network traffic) and Ettercap (an open source network security tool for attacks on local area networks (LANs)), are used to read the headers on message packets and infer the ultimate start and destination of the messages. These inferred events are identified by a start and end time, and a start node and destination node. As each event Ei is received, it is added to the Xnet 300 graph as an edge between the identified start node and destination node. Any event that did not start before or at the start of Ei and end after the end of Ei is removed. Then, a controllability analysis is performed on that graph.

The term "graph" in the context above refers to the abstract mathematical representation of the relationship between communicating entities in a physical network. Furthermore, in this context, "node" means an element in the graph. However, in another context "node" may reference a physical radio in the network. The term "network" most often refers to a physical network.

Figure 3:
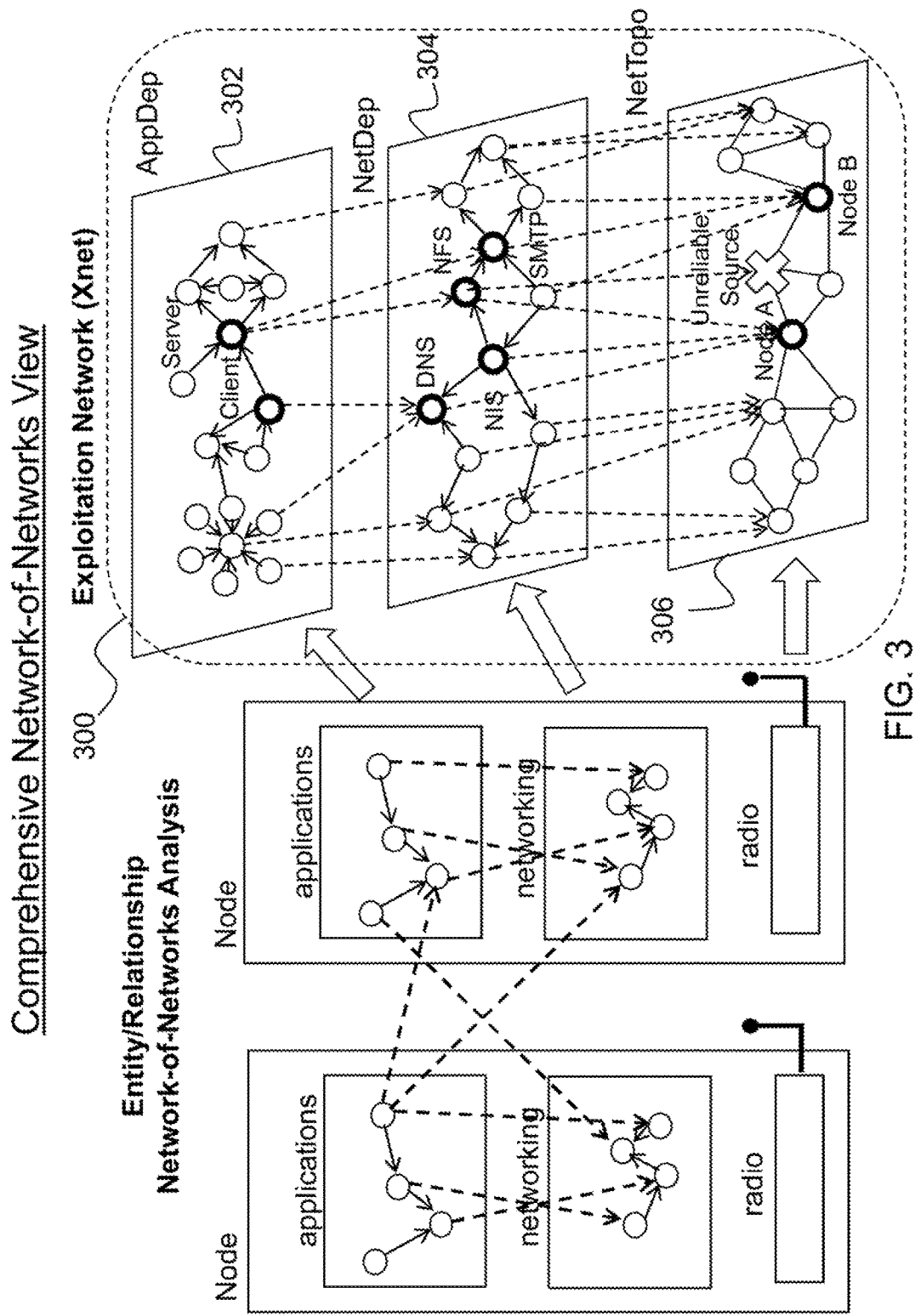
FIG. 3 is an illustration of construction of the Exploitation Network (X net) according to some embodiments of the present disclosure.

FIG. 3 depicts the construction of Xnet 300. The baseline Exploitation Network (Xnet 300) database is loaded into the network at initialization. In this context, the network is a physical radio network. Each physical radio node gets all or a portion of the Xnet database, where the Xnet database is the physical instantiation of the abstract graph of Xnet 300. An application (AppDep) dependency graph 302 and a network (NetDep) dependency graph 304, and their inter-dependencies (represented by dashed lines), are established a priori using expert domain knowledge or by automated inference using public domain tools, such as NSDMiner and Ettercap. Interdependencies between the AppDep dependency graph 302, the NetDep dependency graph 304, and the network topology (NetTopo) dependency graph 306 are based on the software configuration in the network. Significantly, the "nodes" on the left side of FIG. 3 (Entity/Relationship Network of Networks Analysis) represent physical radio nodes, while the "nodes" depicted in the Xnet 300 represent abstract nodes in the graph.

(3.2) Network Controllability

Network controllability analysis determines the minimal set of nodes required to control the global state of the network. In an embodiment of the present disclosure, a maximum matching algorithm (see Literature Reference Nos. 1 and 2 for a description of the maximum matching algorithm) is employed to compute controllability. The minimum number of inputs required to control the network ($N_D$, or number of driver nodes) is given by the total number of nodes minus the number of nodes in the maximum matching set. These nodes (that are members of the minimal set of nodes required to control the global state of the network) are called "driver nodes". Once the Xnet 300 is constructed, many standard network science algorithms may be computed on the Xnet 300 representation. Non-limiting examples of such algorithms (metrics) are listed below in Table 1 below. For instance, different types of centrality measurements (e.g., degree, closeness, betweenness (see Literature Reference No. 14 for a description of the aforementioned measurements)) can be used as such an algorithm or metric. Network controllability metrics are computed on a graphical representation of a pattern of communication between nodes during a time window, where the network events contained in the graph start before or at the start of a particular network event and end before the end of that particular network event A unique aspect of the approach described in the present disclosure is to analyze the wireless network activity by looking at the change in global and local controllability metrics, such as those listed in Table 1 below, over time. Table 1 includes examples of controllability metrics used for attack detection and attribution.

TABLE 1

| | Global metrics |
|---|---|
| N | number of nodes |
| E | number of edges |
| $N_D$ | number of driver nodes = total # nodes minus the cardinality of the maximum matching set |
| <k> | mean degree |
| $n_D$ | fraction of driver nodes = $N_D/N$ |
| $n_s$ | fraction of source nodes with in-degree 0. |
| $n_e$ | fraction of external dilations (a sink node; always a destination, |

TABLE 1-continued

| | |
|---|---|
| | never a source) |
| $n_i$ | fraction of internal dilations, which is driver nodes $N_D$ that are not solely sources or sinks. |
| $n^I_c$ | fraction of type-I critical nodes. Its removal will increase $N_D$. |
| $n^I_r$ | fraction of type-I redundant nodes. Its removal will decrease $N_D$. |
| $n^I_o$ | fraction of type-I ordinary nodes. Its removal will not change $N_D$. |
| $n^{II}_c$ | fraction of type-II critical nodes. They are always be driver nodes. |
| $n^{II}_r$ | fraction of type-II redundant nodes. They will never be driver nodes. |
| $n^{II}_o$ | fraction of type-II ordinary nodes. They are neither critical nor redundant. |
| $l_c$ | fraction of critical links. They belong to all maximum matchings. |
| $l_r$ | fraction of redundant links. They do not belong to any maximum matching. |
| $l_o$ | fraction of ordinary link. They are neither critical nor redundant. |
| <lcc> | average local clustering coefficient (undirected) |
| gcc | global clustering coefficient (undirected) |
| <lcc$^d$> | average local clustering coefficient (directed) |
| gcc$^d$ | global clustering coefficient (directed) |
| <BC> | average betweenness centrality (undirected) |
| <BC$^d$> | average betweenness centrality (directed) |
| <CL> | average closeness centrality (undirected) |
| <CL$^d$> | average closeness centrality (directed) |
| <AC> | average authority centrality |
| <HC> | average hub centrality |
| <$C_c$> | average control centrality |
| Local metrics | |
| $C_c(i)$ | control centrality of node i |
| BC(i) | betweenness centrality of node i |
| CL(i) | closeness centrality of each node i |
| AC(i) | authority centrality of each node i |
| HC(i) | hub centrality of each node i |
| BC$^d$(i) | (directed) betweenness centrality of each node i |
| CL$^d$(i) | (directed) closeness centrality of each node i |

(3.3) Attack Detection and Attribution Using Controllability Analysis

Figures 4A, 4B:
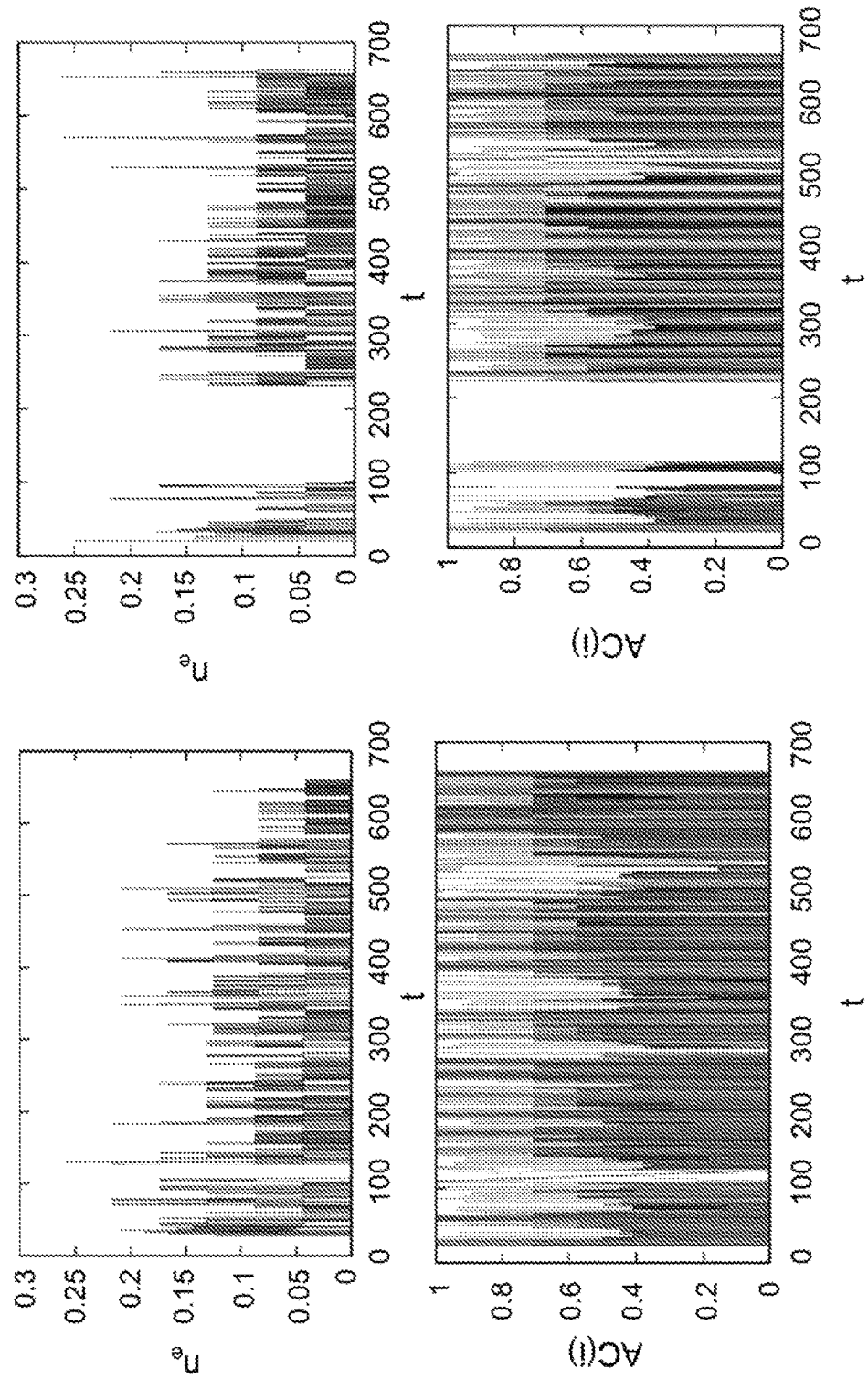
FIG. 4A is an illustration of results from attack detection and attribution in a 25 node baseline scenario using network controllability metrics according to some embodiments of the present disclosure.
FIG. 4B is an illustration of results from attack detection and attribution in a 25 node attack behavior scenario using network controllability metrics according to some embodiments of the present disclosure.

FIGS. 4A and 4B illustrate two metrics computed for a baseline 25 node scenario (in FIG. 4A) and for a flooding attack in an Army Research Lab 25 node scenario (in FIG. 4B). The metrics are $n_e$ (fraction of eternal dilations) in the top rows of FIGS. 4A and 4B and AC(i) (authority centrality of each node) in the bottom rows of FIGS. 4A and 4B. The results shown are from a flooding attack in transmission control protocol (TCP) traffic from 20% of the nodes in the network to a single node, starting at 100 seconds and lasting 130 seconds. Background traffic in this example was generated by a public domain program called MGEN developed by the Naval Research Laboratory (NRL) PROTocol Engineering Advanced Networking (PROTEAN) Research Group. MGEN provides the ability to perform IP network performance tests and measurements using TCP and user datagram protocol (UDP)/Internet protocol (IP) traffic. Here, the network metrics in hypertext transfer protocol (HTTP) traffic are shown. When the flooding attack occurs (shown in FIG. 4B), both the global network metric $n_e$ and the local network metric AC(i) display abnormal behavior compared to the baseline performance shown in FIG. 4A. The abnormality is apparent in the absence of metric values greater than zero in the simulation between 100 and 225 seconds. The next paragraph describes how such a noisy graph can be smoothed to make the metric a definitive signal when the smoothed values reach zero.

Note that in FIGS. 4A and 4B, as in most metric plots, the metric values can vary in a noisy way, so it is necessary to smooth the graph by same technique, such as a median filter. Then, a threshold can be selected such that there is a clear difference between the attack behavior and the baseline behavior. For example, in FIGS. 4A and 4B, both metrics actually go to zero around time 100 seconds for both the baseline (FIG. 4A) and attack (FIG. 4B). However, the baseline gap is quite short. The smoothing filter should be configured so as to smooth over such a short time gap. An automated machine learning system can be used to discover appropriate thresholds, given examples of smoothed baseline and attack metric data. In an embodiment of the present disclosure, a support vector machine (SVM) was used for this purpose, although there are many other machine learning methods that could be applied. A SVM can learn to find a plane in feature hyperspace that can separate examples of baseline performance (FIG. 4A) from attack behavior (FIG. 4B), as depicted in FIG. 5B.

Figure 5A:
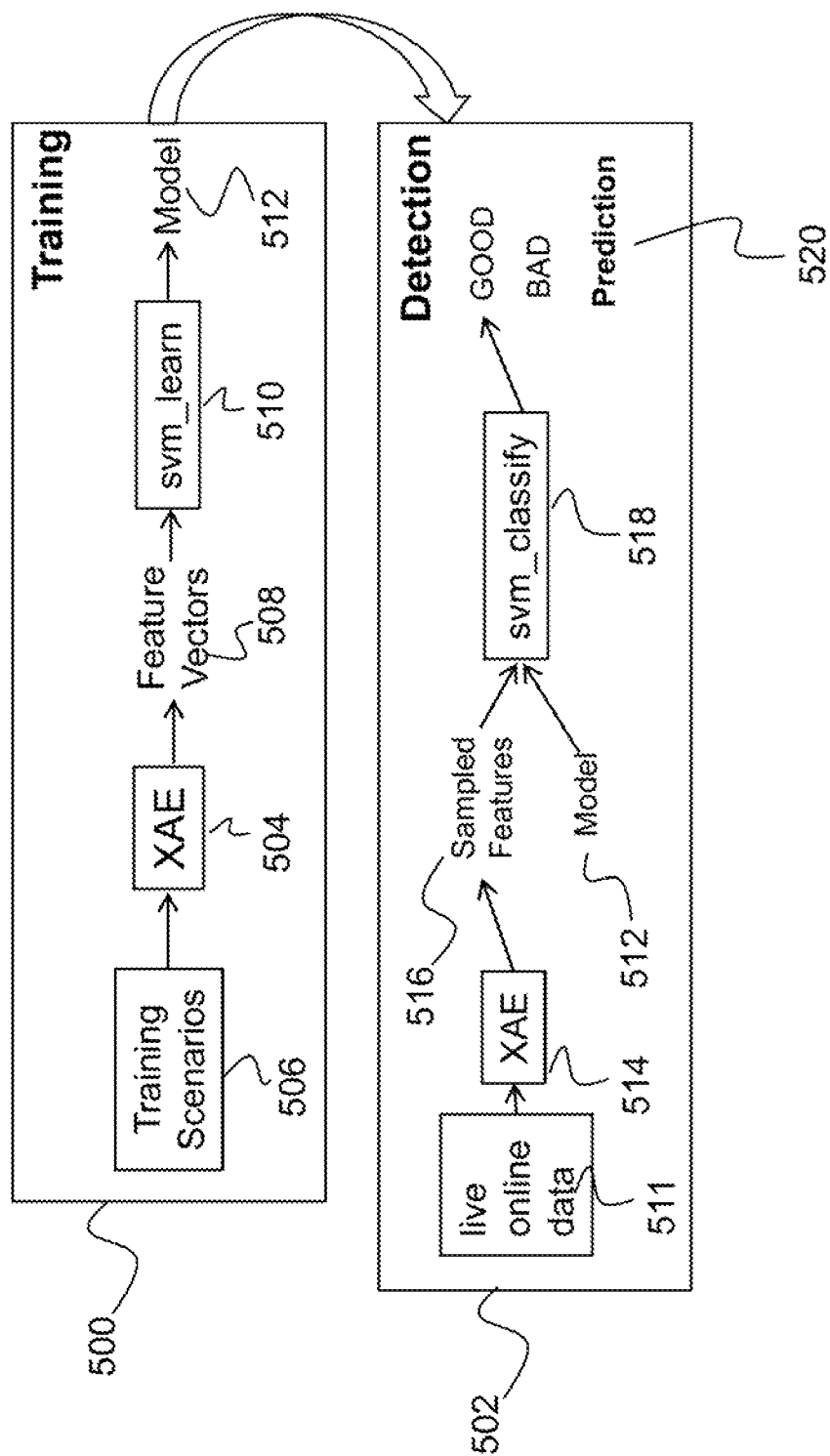
FIG. 5A is an illustration of use of a support vector machine (SVM) to find a threshold to classify attack behavior based on network controllability metrics according to some, embodiments of the present disclosure.

FIG. 5A illustrates the training process 500 and the subsequent online classification/detection process 502. A non-limiting example of the use of a SVM to find a threshold to classify baseline vs. attack behavior based on network controllability metrics on network communication activity is shown. Baseline activity is captured by running the network in the absence of attacks. XAE 504 is an Xnet Analytics Engine, which turns the raw network packet data of training scenarios 506 to an Xnet graph. The Xnet graph contains the NC module that extracts feature vectors 508 from the Xnet graph, which are the controllability metrics (currently 35 metrics), such as those listed in Table 1 above. The feature vectors 508 will most conveniently be captured offline and stored as one vector of all metric values for each time window, resulting in a matrix when the feature vectors 508 for various time windows are captured and combined. Additionally, examples are provided of attacks by performing attacks on the baseline scenarios, and again running them through XAE 504 to extract feature vectors 508. Then, the SVM (i.e., svm_learn 510) is trained by presenting each feature vector 508 along with a binary vector indicating, for each time period, whether an attack is present or not, resulting, in a trained classifier model 512. Once the SVM (i.e., svm_learn 510) is trained, it can be run during live online network operation (live online data 511) and will indicate when an attack is occurring in the classification/detection process 502. Specifically, during normal online operation, the XAE system 514 is used to extract sampled features 516 from current raw network packet data which, along with the trained model 512, is input to the SVM which can then be used to classify (i.e., svm_classify 518) the sampled features 516 and make a prediction 520 regarding whether an attack is present (i.e., good) or not (i.e., bad). The features that are output by XAE (508 during training and 516 when online testing) are one from each of the metrics in Table 1, smoothed as described above, and turned into a binary indication of whether the value is anomalous or not anomalous. This could be visualized as a visual panel of dots or diodes depicting a specific pattern to indicate whether an attack is present or not, and what kind of attack it is.

Figure 5B:
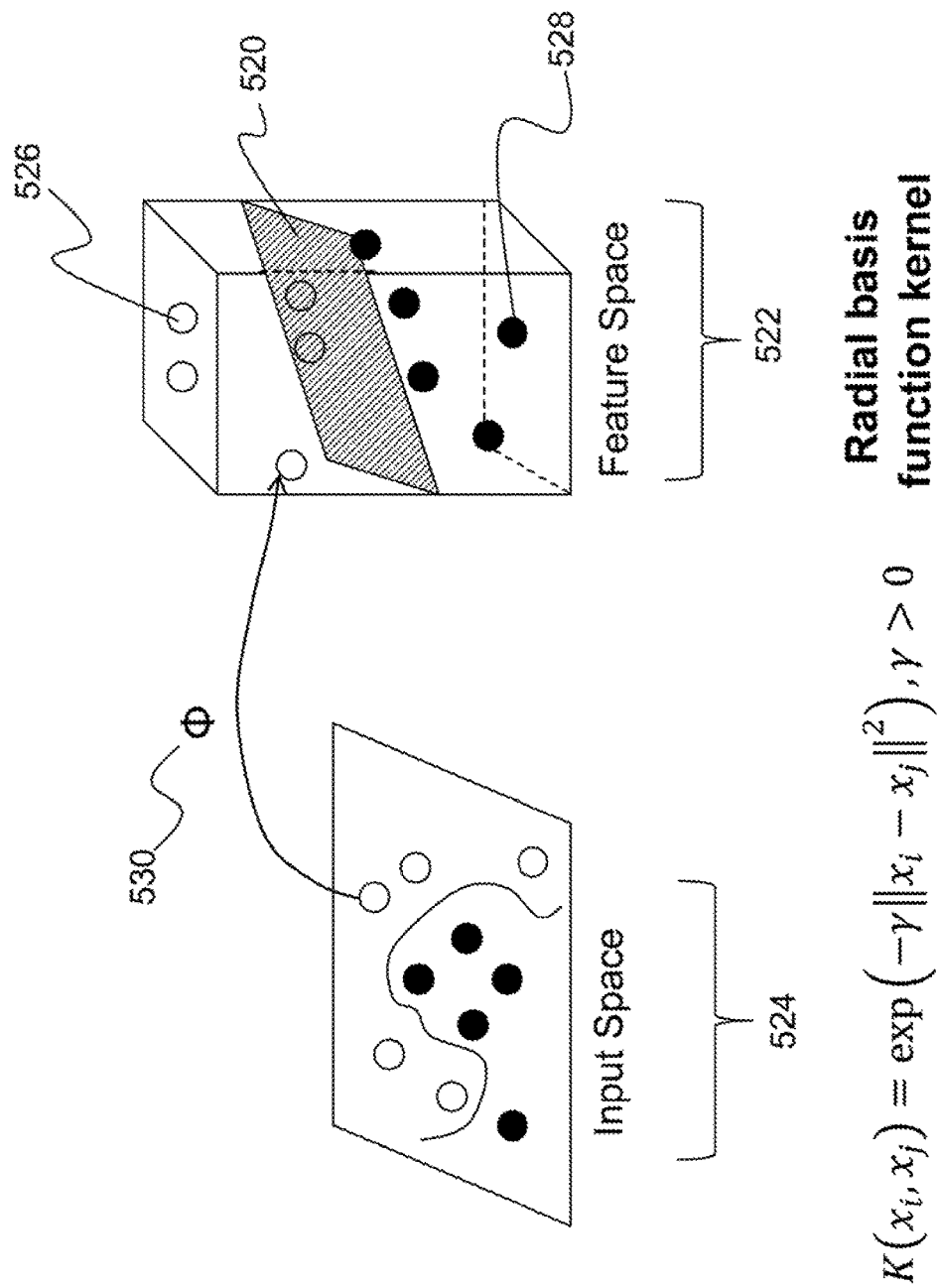
FIG. 5B is an illustration of the SVM learning to find a plane in feature hyperspace that can separate examples of baseline performance from attack behavior according to some embodiments of the present disclosure.

FIG. 5B depicts how the SVM learns to find a plane 520 in such a feature space 522 from an input space 524. The plane 520 can separate examples of baseline performance 526 from examples of attack behavior 528. An SVM is applied using a known kernel Φ 530 (e.g., see equation in FIG. 5B). The kernel is a similarity function over pairs of data points (i.e., between a labeled training set point and an unlabeled test point). Training is done by presenting examples of attacks and examples of baseline (without attacks). The SVM learns to separate attack situations from baseline by finding weights that can be described as defining a hyperplane separating baseline from attacks. Subsequently, one applies the trained model and uses the similarity function (kernel Φ 530) to classify the new unlabeled inputs as more similar to the attacks or the baseline points. In FIG. 5B, each circle represents a data point. Specifically, each data point is a value of the current 35-element feature vector.

Figure 8B:
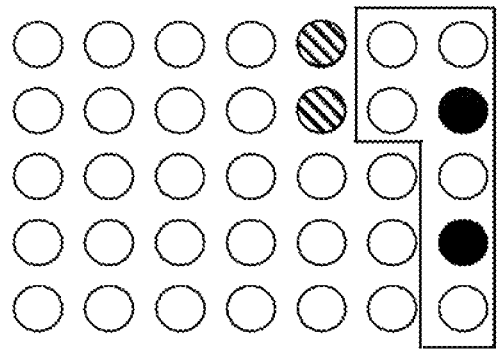
FIG. 8B is an illustration of a diode pattern of 35 network metrics during a reset-all attack according to some embodiments of the present disclosure.
Figure 8A:
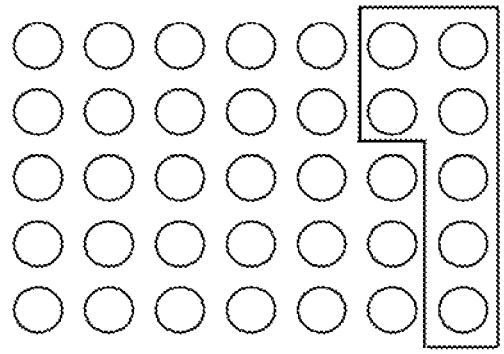
FIG. 8A is an illustration of a diode pattern of 35 network metrics for baseline activity according to some embodiments of the present disclosure.
Figure 9:
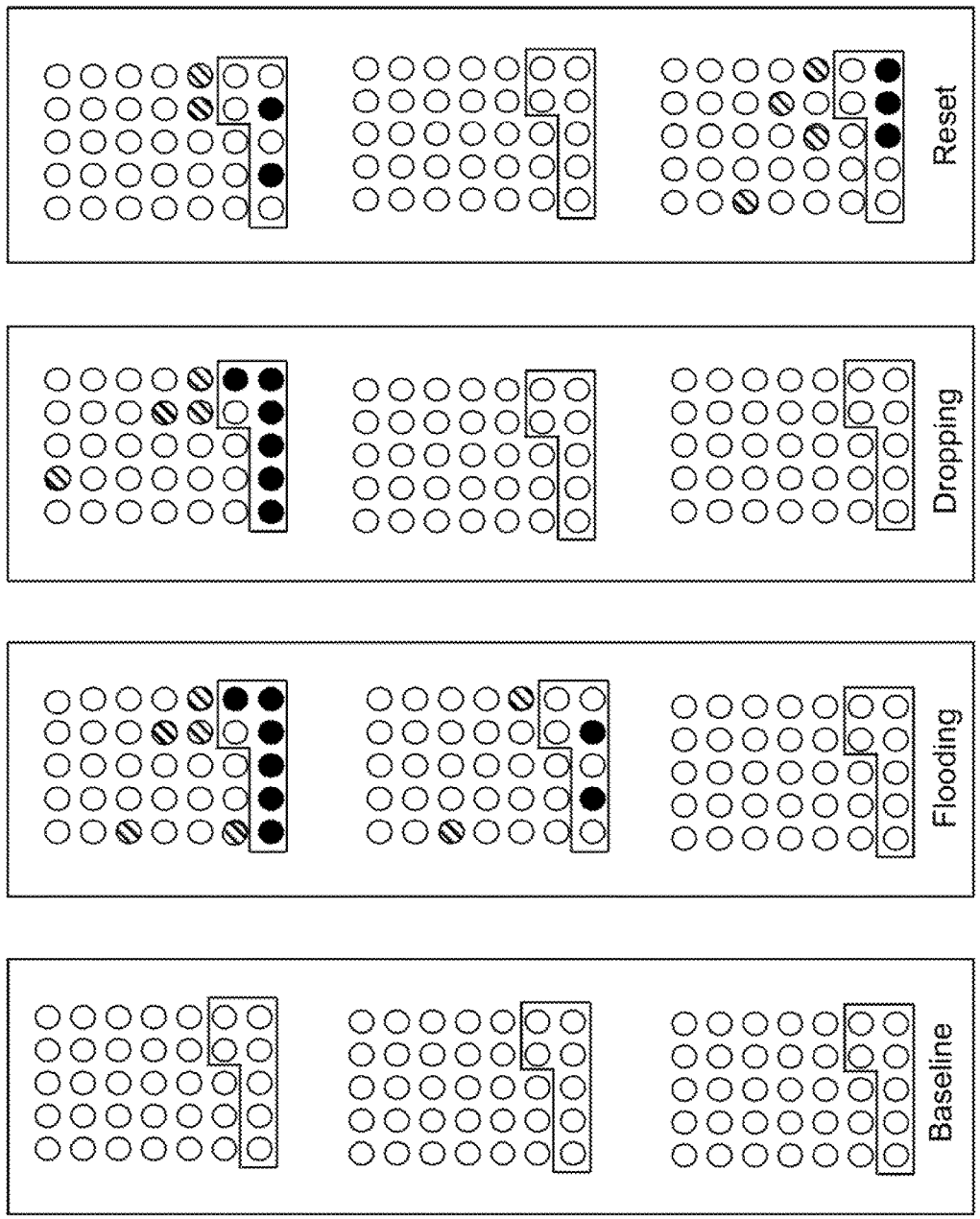
FIG. 9 is an illustration of a summary panel of diode patterns of 35 network metrics in three different layers for baseline, drop-all, and reset-all attacks according to some embodiments of the present disclosure.

Users can view each network metric as a "diode", and the 35 network metrics can be displayed in a panel, such as those shown in FIG. 6A through FIG. 9. When an attack occurs, a particular set of diodes will light up or change colors. This pattern can be used for efficient attack detection and attribution. The network metrics in Table 1 can be applied to different networking protocol layers (e.g., UDP, TCP, HTTP) and the resulting binary "anomaly/no-anomaly" outputs for each of the protocol layers can be displayed in separate panels. Different layers (i.e., different network protocols) might yield different patterns. FIG. 9 illustrates separate panels for HTTP, TCP, and connections layers of the network. Combining all diode patterns from different layers enables one to perform attack detection and attribution more accurately.

FIGS. 6A and 6B show an example of a diode pattern for attack detection and attribution using all the 35 network metrics, where each diode (circle) represents a network metric. Attribution during a network attack means identifying the attacking nodes. Specifically, FIG. 6A depicts 35 network metrics for baseline activity, and FIG. 6B depicts 35 network metrics during an HTTP flooding attack. A flooding attack causes nodes to broadcast messages, effectively using up the network bandwidth so that legitimate messages cannot get through. Those network metrics displaying abnormal behavior when the attack occurs are highlighted. In FIG. 6B (and similar figures), global and local metrics are represented by pattern filled circles 600 and solid filled circles 602, respectively.

Figure 7B:
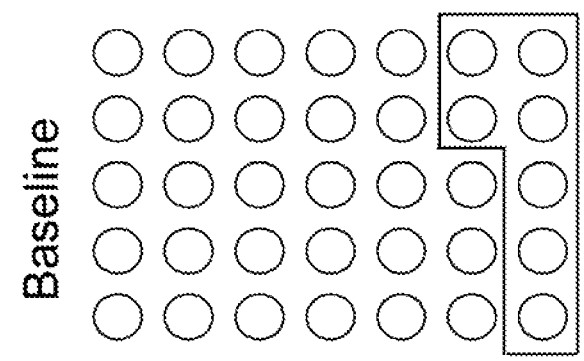
FIG. 7B is an illustration of a diode pattern of 35 network metrics during a drop-all attack according to some embodiments of the present, disclosure.
Figure 7A:
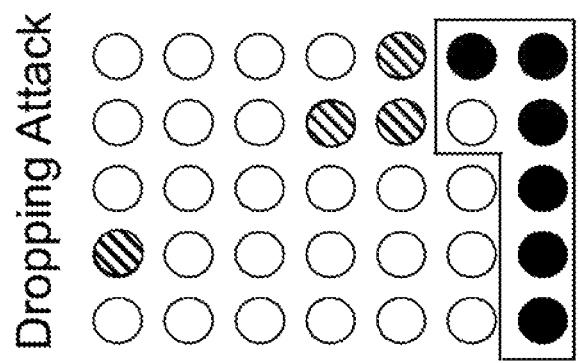
FIG. 7A is an illustration of a diode pattern of 35 network metrics for baseline activity according to some embodiments of the present disclosure.

FIG. 7A illustrates 35 network metrics for baseline activity, and FIG. 7B illustrates 35 network metrics during a drop-all attack. In a dropping attack, a node advertises itself as the shortest path to everywhere and then drops any packets it is asked to route to other nodes.

FIG. 8A illustrates 35 network metrics for baseline activity, and FIG. 8B depicts 35 network metrics during a reset-all attack. A reset attack is a man-in-the-middle attack where the attackers are destroying active TCP connections that they are aware of by sending forged TCP reset packets to the involved parties. This causes both of the participants in the TCP connection to believe that the other terminated the TCP connection.

The seven outlined nodes in each of FIGS. 6B, 7B, and 8B represent local metrics identified in Table 1 above. The other nodes represent global metrics. The different patterns in FIGS. 6B, 7B, and 8B reflects the fact that each attack affects the network differently. Each metric measures a different aspect of network activity, so the patterns made in the panel of metrics is significantly indicative of different attacks. That is why it is useful to employ many metrics.

FIG. 9 summarizes results of attack detection and attribution for all the three attack models: flooding, drop-all and reset-all, using three different layers: HTTP, TCP, and IP connections. All three layers are considered to be sublayers of NetDep (element 304) in FIG. 3.

Mobile wireless networks are experiencing widespread use in applications such as mobile vehicle-to-vehicle networks, user-to-user networks, sensor-to-sensor networks, vehicle-to-infrastructure networks, commercial mesh networks, wireless infrastructure Internet service providers (ISPs), and cellular companies. The system according to embodiments of the present disclosure will significantly improve the security of these and other related networks, which currently rely predominantly on packet-level encryption to reduce the probability of external intrusion but do not detect or prevent "network insider" attacks.

In an embodiment, after identifying the presence of misinformation in the network, the system performs an operation to attribute who is responsible for the attack. After attributing the attack to an entity, the system can take actions to mitigate the attack. A non-limiting example of a mitigation action would be to isolate the attacking node (i.e., physical radio). For example, the action can include informing every other node in the network to simply ignore anything that the attacking node transmits, and not to send anything to, or through, the attacking node.

Implementation of the system described herein takes the form of a set of algorithms that provides rapid and accurate detection and prediction of sources of misinformation in the control plane of a wireless network. The algorithms/modules are protocol agnostic characteristics of the tool that will enable its transition into a wide variety of network security systems, including both wireless and wired networks. Furthermore, the inherent scalability of the approach makes it well-suited to operate effortlessly in much larger networks.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting and mitigating attacks of misinformation on communication networks, the system comprising:
one or more processors and a non-transitory memory having instructions encoded thereon such that when the instructions are executed, the one or more processors perform operations of:
computing a plurality of network controllability metrics on a representation of a communication network comprising a plurality of nodes;
detecting changes in the plurality of network controllability metrics;
using the detected changes to detect an attack of misinformation on the communication network, wherein given a set of examples of network controllability metric data representing a baseline behavior and a set of examples of network controllability metric data representing an attack behavior, a machine learning classifier determines a threshold for attack detection based on differences between the baseline behavior and the attack behavior;
attributing the attack to an attacking node in the communication network; and
performing a mitigation action that isolates the attacking node from the communication network.

2. The system as set forth in claim 1, wherein the representation includes network topology, network dependencies, and application dependencies within the communication network.

3. The system as set forth in claim 1, wherein the plurality of network controllability metrics are computed as a function of a pattern of communication between the plurality of nodes of the communication network during a given time window.

4. The system as set forth in claim 1, wherein each network controllability metric is represented as a diode in a diode pattern panel, wherein network controllability metrics displaying attack behavior, as determined by the threshold for attack detection, are highlighted in the diode pattern panel.

5. The system as set forth in claim 1, wherein the mitigation action further comprises informing every other node in the communication network to ignore anything that the attacking node transmits, and not to send anything to, or through, the attacking node.

6. The system as set forth in claim 1, wherein the one or more processors further perform operations of:
outputting features representing each of the plurality of network controllability metrics;
converting each feature into a binary indication of whether a value is anomalous or not anomalous; and
using the binary indication to detect changes in the plurality of network controllability metrics.

7. The system as set forth in claim 1, wherein the representation is a graphical representation of network topology, network dependencies, and application dependencies within the communication network.

8. The system as set forth in claim 1, wherein the plurality of network controllability metrics are computed on a graphical representation of a pattern of communication between the plurality of nodes of the communication network during a given time window.

9. A computer-implemented method for detecting and mitigating attacks of misinformation on communication networks, comprising:
an act of causing one or more processors to execute instructions stored on a non-transitory memory such that upon execution, the one or more processors perform operations of:
computing a plurality of network controllability metrics on a representation of a communication network comprising a plurality of nodes;
detecting changes in the plurality of network controllability metrics;
using the detected changes to detect an attack of misinformation on the communication network, wherein given a set of examples of network controllability metric data representing a baseline behavior and a set of examples of network controllability metric data representing an attack behavior, a machine learning classifier determines a threshold for attack detection based on differences between the baseline behavior and the attack behavior;
attributing the attack to an attacking node in the communication network; and
performing a mitigation action that isolates the attacking node from the communication network.

10. The method as set forth in claim 9, wherein the representation includes network topology, network dependencies, and application dependencies within the communication network.

11. The method as set forth in claim 9, wherein the plurality of network controllability metrics are computed as a function of a pattern of communication between the plurality of nodes of the communication network during a given time window.

12. The method as set forth in claim 9, wherein each network controllability metric is represented as a diode in a diode pattern panel, wherein network controllability metrics displaying attack behavior, as determined by the threshold for attack detection, are highlighted in the diode pattern panel.

13. A computer program product for detecting and mitigating attacks of misinformation on communication networks, the computer program product comprising:
computer-readable instructions stored on a non-transitory computer-readable medium that are executable by a computer having one or more processors for causing the processor to perform operations of:
computing a plurality of network controllability metrics on a representation of a communication network comprising a plurality of nodes;
detecting changes in the plurality of network controllability metrics;
using the detected changes to detect an attack of misinformation on the communication network, wherein given a set of examples of network controllability metric data representing a baseline behavior and a set of examples of network controllability metric data representing an attack behavior, a machine learning classifier determines a threshold for attack detection based on differences between the baseline behavior and the attack behavior;
attributing the attack to an attacking node in the communication network; and
performing a mitigation action that isolates the attacking node from the communication network.

14. The computer program product as set forth in claim 13, wherein the representation includes network topology, network dependencies, and application dependencies within the communication network.

15. The computer program product as set forth in claim 13, wherein the plurality of network controllability metrics are computed as a function of a pattern of communication between the plurality of nodes of the communication network during a given time window.

16. The computer program product as set forth in claim 13, wherein each network controllability metric is represented as a diode in a diode pattern panel, wherein network controllability metrics displaying attack behavior, as determined by the threshold for attack detection, are highlighted in the diode pattern panel.

* * * * *